United States Patent
Saito et al.

(10) Patent No.: US 11,188,953 B2
(45) Date of Patent: Nov. 30, 2021

(54) PRODUCT SUGGESTION SYSTEM, PRODUCT SUGGESTION METHOD, AND PROGRAM

(71) Applicant: PANASONIC INTELLECTUAL PROPERTY MANAGEMENT CO., LTD., Osaka (JP)

(72) Inventors: Takao Saito, Nara (JP); Yasunobu Tsukio, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/639,042

(22) PCT Filed: Sep. 19, 2018

(86) PCT No.: PCT/JP2018/034593
§ 371 (c)(1),
(2) Date: Feb. 13, 2020

(87) PCT Pub. No.: WO2019/059213
PCT Pub. Date: Mar. 28, 2019

(65) Prior Publication Data
US 2020/0226645 A1    Jul. 16, 2020

(30) Foreign Application Priority Data
Sep. 20, 2017 (JP) .............................. JP2017-180725

(51) Int. Cl.
*G06Q 30/00* (2012.01)
*G06Q 30/02* (2012.01)
(Continued)

(52) U.S. Cl.
CPC ......... *G06Q 30/0281* (2013.01); *G06F 3/165* (2013.01); *G06Q 10/087* (2013.01);
(Continued)

(58) Field of Classification Search
CPC ............. G06Q 30/0281; G06Q 10/087; G06Q 30/0269; G06Q 30/0605; G06Q 30/0631;
(Continued)

(56) References Cited

U.S. PATENT DOCUMENTS

| | | | | |
|---|---|---|---|---|
| 2005/0234771 A1* | 10/2005 | Register | ............. | G06Q 30/0226 705/14.25 |
| 2016/0253710 A1* | 9/2016 | Publicover | ......... | H04N 21/4532 705/14.66 |
| 2017/0011449 A1* | 1/2017 | Mueller | ............. | G06Q 30/0635 |

FOREIGN PATENT DOCUMENTS

| | | |
|---|---|---|
| JP | 2006-227667 A | 8/2006 |
| JP | 2010-039095 A | 2/2010 |
| JP | 2015-018301 A | 1/2015 |

OTHER PUBLICATIONS

International Search Report and Written Opinion issued in International Patent Application No. PCT/JP2018/034593, dated Dec. 4, 2018; with partial English translation.

* cited by examiner

*Primary Examiner* — Sun M Li
(74) *Attorney, Agent, or Firm* — McDermott Will and Emery LLP

(57) ABSTRACT

A speech output system includes a directional loudspeaker configured to produce a speech output directed to at least one audible area. The at least one audible area is defined by at least one of a presence area of a customer or a selling space as a unit in a premise in which a plurality of kinds of products are displayed. A control system is configured to control the speech output system. The control system is configured to cause the directional loudspeaker to produce a speech output of product information regarding a target product based on supply information, the supply information being information which is acquired from a supply status (Continued)

management system and which represents a supply status of the target product.

16 Claims, 13 Drawing Sheets

(51) Int. Cl.
*G06F 3/16* (2006.01)
*G06Q 10/08* (2012.01)
*G06Q 30/06* (2012.01)
*H04R 1/32* (2006.01)

(52) U.S. Cl.
CPC ..... *G06Q 30/0269* (2013.01); *G06Q 30/0605* (2013.01); *G06Q 30/0631* (2013.01); *H04R 1/323* (2013.01)

(58) Field of Classification Search
CPC ......... G06Q 30/06; G06F 3/165; G06F 3/167; H04R 1/323
See application file for complete search history.

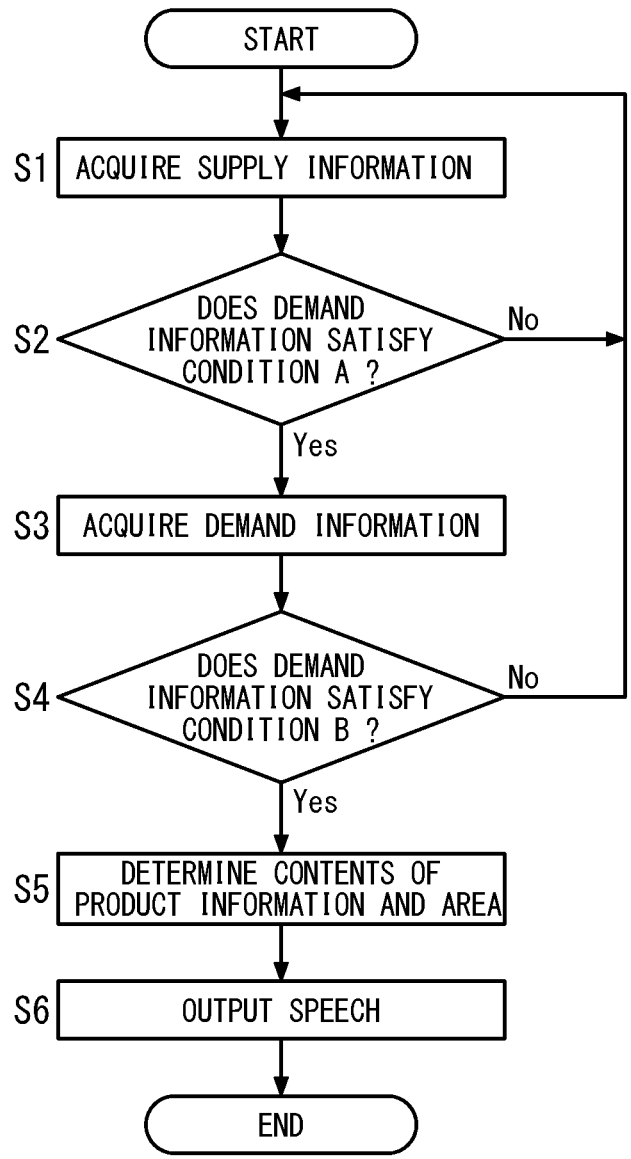

PRODUCT SUGGESTION SYSTEM, PRODUCT SUGGESTION METHOD, AND PROGRAM

CROSS-REFERENCE OF RELATED APPLICATIONS

This application is the U.S. National Phase under 35 U.S.C. § 371 of International Patent Application No. PCT/JP2018/034593, filed on Sep. 19, 2018, which in turn claims the benefit of Japanese Application No. 2017-180725, filed on Sep. 20, 2017, the entire disclosures of which Applications are incorporated by reference herein.

TECHNICAL FIELD

The present disclosure generally relates to product suggestion systems, product suggestion methods, and programs, and more specifically, to a product suggestion system, a product suggestion method, and a program for use in a premise in which a plurality of kinds of products are displayed.

BACKGROUND ART

Patent Literature 1 describes a product suggestion system (audio output control device) in which a control device connected to a super directional loudspeaker configured to output a speech in a particular direction causes the super directional loudspeaker to output a speech so as to advertise products. In this product suggestion system, a person who is included in people in an image captured by a camera and who has an attribute satisfying a prescribed condition is defined as a target person, and this product suggestion system causes the super directional loudspeaker to output a speech with the audio output direction of the super directional loudspeaker being directed toward the target person. Further, the product suggestion system acquires sales information relating to sales of products related to advertisements while outputting the audio from the super directional loudspeaker, and based on the sales information thus acquired, the product suggestion system changes the condition for detecting the target person.

In the product suggestion system described in Patent Literature 1, however, a subject person to whom the speech is to be output from the super directional loudspeaker is determined based on only attributes of customers (people who are in the image captured by the camera). Therefore, in the product suggestion system described in Patent Literature 1, the product suggestion (advertisement) may be performed without consideration of circumstances of a seller, such as a stock-out or overstock.

CITATION LIST

Patent Literature

Patent Literature 1: JP 2010-039095 A

SUMMARY OF INVENTION

In view of the foregoing, an object of the present the present disclosure is to provide a product suggestion system, a product suggestion method, and a program which enable a product suggestion in consideration of circumstances of a seller.

A product suggestion system according to one aspect of the present disclosure includes a speech output system and a control system. The speech output system includes a directional loudspeaker configured to produce a speech output directed to at least one audible area. The at least one audible area is defined by at least one of a presence area of a customer or a selling space as a unit in a premise in which a plurality of kinds of products are displayed. The control system is configured to control the speech output system. The control system is configured to cause the directional loudspeaker to produce a speech output of product information regarding a target product based on supply information. The supply information is information which is acquired from a supply status management system and which represents a supply status of the target product. The target product includes at least one kind of product of the plurality of kinds of products.

A product suggestion method according to one aspect of the present disclosure is a method of controlling a speech output system. The speech output system includes a directional loudspeaker configured to produce a speech output directed to an audible area. The audible area is defined by at least one of a presence area of a customer or a selling space as a unit in a premise in which a plurality of kinds of products are displayed. The product suggestion method includes causing the directional loudspeaker to produce a speech output of product information regarding a target product based on supply information. The supply information is information which is acquired from a supply status management system and which represents a supply status of the target product. The target product includes at least one kind of product of the plurality of kinds of products.

A program according to one aspect of the present disclosure is a program configured to cause a computer system to execute the product suggestion method.

BRIEF DESCRIPTION OF DRAWINGS

FIG. 11 is a flow chart illustrating operation of the control system in the product suggestion system;

DESCRIPTION OF EMBODIMENTS

First Embodiment (1) Schema

Figure 1:
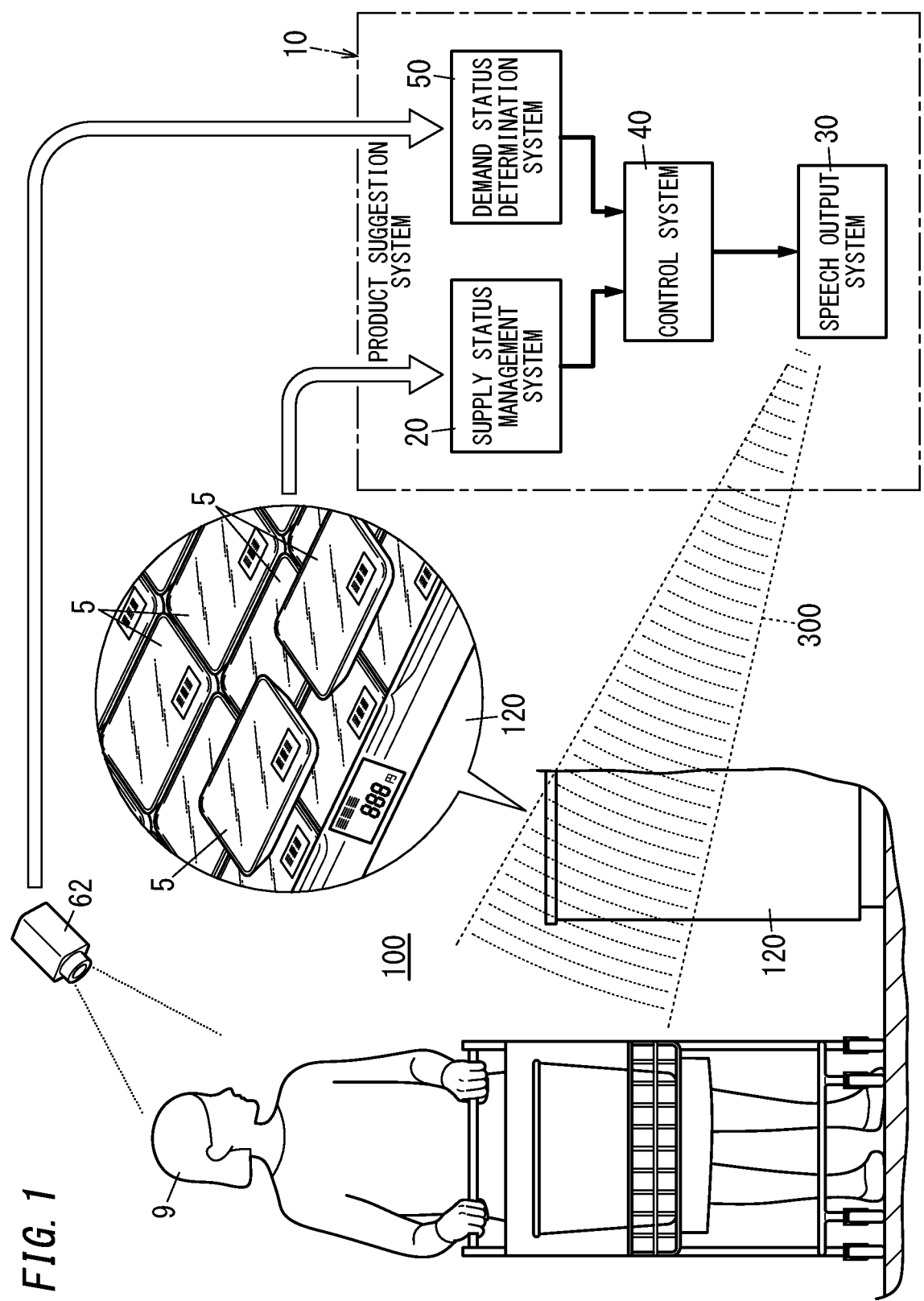
FIG. 1 is an explanatory view schematically illustrating a product suggestion system according to a first embodiment.

As illustrated in FIG. 1, a product suggestion system 10 according to the present embodiment is introduced into a premise 100 in which a plurality of kinds of products 5a, 5b, 5c . . . (see FIG. 3) are displayed. When the plurality of kinds of products 5a, 5b, 5c . . . are not particularly distinguished from one another, each of the plurality of kinds of products 5a, 5b, 5c . . . is hereinafter referred to as a "product 5". As used herein, "a plurality of kinds of products" means a variety of products such as food, commodities, and apparel displayed in the premise 100. In this disclosure, products belonging to the same kind will be described as one kind (one item) of products 5 although they are a plurality of products. That is, in a retail establishment such as a supermarket, in general, a plurality of products are displayed for each of the items, but both one product and a plurality of products belonging to the same kind (the same item) are described as one kind (one item) of product(s) 5.

The product suggestion system 10 is introduced into the premise 100 of a retail establishment type, such as a retail store, for example, a supermarket, a department store, a convenience store, a consumer electronics retail establishment, an apparel store, or a hardware store. The present embodiment describes a case where the premise 100 is, for example, a supermarket that handles a plurality of kinds of products 5, for example, food. In the premise 100, a customer 9 visiting the premise 100 finds one or more products 5 of interest from a plurality of kinds of products 5 displayed and purchases the one or more products 5 of interest. Specifically, the customer 9 picks up the one or more products 5 of interest and puts the one or more products 5 of interest in a shopping basket or a shopping cart while moving in the premise 100. Then, the customer 9 performs checkout processing of the one or more products 5 of interest at a checkout counter, and thereby, the customer 9 can purchase the one or more products 5 of interest.

The product suggestion system 10 is a system configured to produce a speech output of product information regarding the product 5 to suggest the product 5 to the customer 9 in the premise 100. The product suggestion system 10 at least includes a speech output system 30 and a control system 40. The speech output system 30 produces the speech output directed to an audible area 300. The control system 40 is configured to control the speech output system 30. Here, the control system 40 controls the speech output system 30 based on supply information representing a supply status of a target product such that the speech output system 30 produces a speech output of product information regarding the target product.

As used herein, "target product" refers to a product 5 which includes at least one kind of product(s) 5 of a plurality of kinds of products 5 and whose product information is to be output from the product suggestion system 10. As used herein, "supply status" refers to, for example, the quantity of stock, sales volume, target sales volume, or target achievement rate of the target product in the premise 100. That is, "supply information" as used herein is information which represents the supply status of the target product and which is acquired from a supply status management system 20. The supply status management system 20 is, for example, a Point Of Sales (POS) system configured to manage at least one of the quantity of stock and the sales volume of the plurality of kinds of products 5 in the premise 100. The supply information is information based on at least one of the quantity of stock or the sales volume of the plurality of kinds of products 5 in the premise 100.

Figure 2:
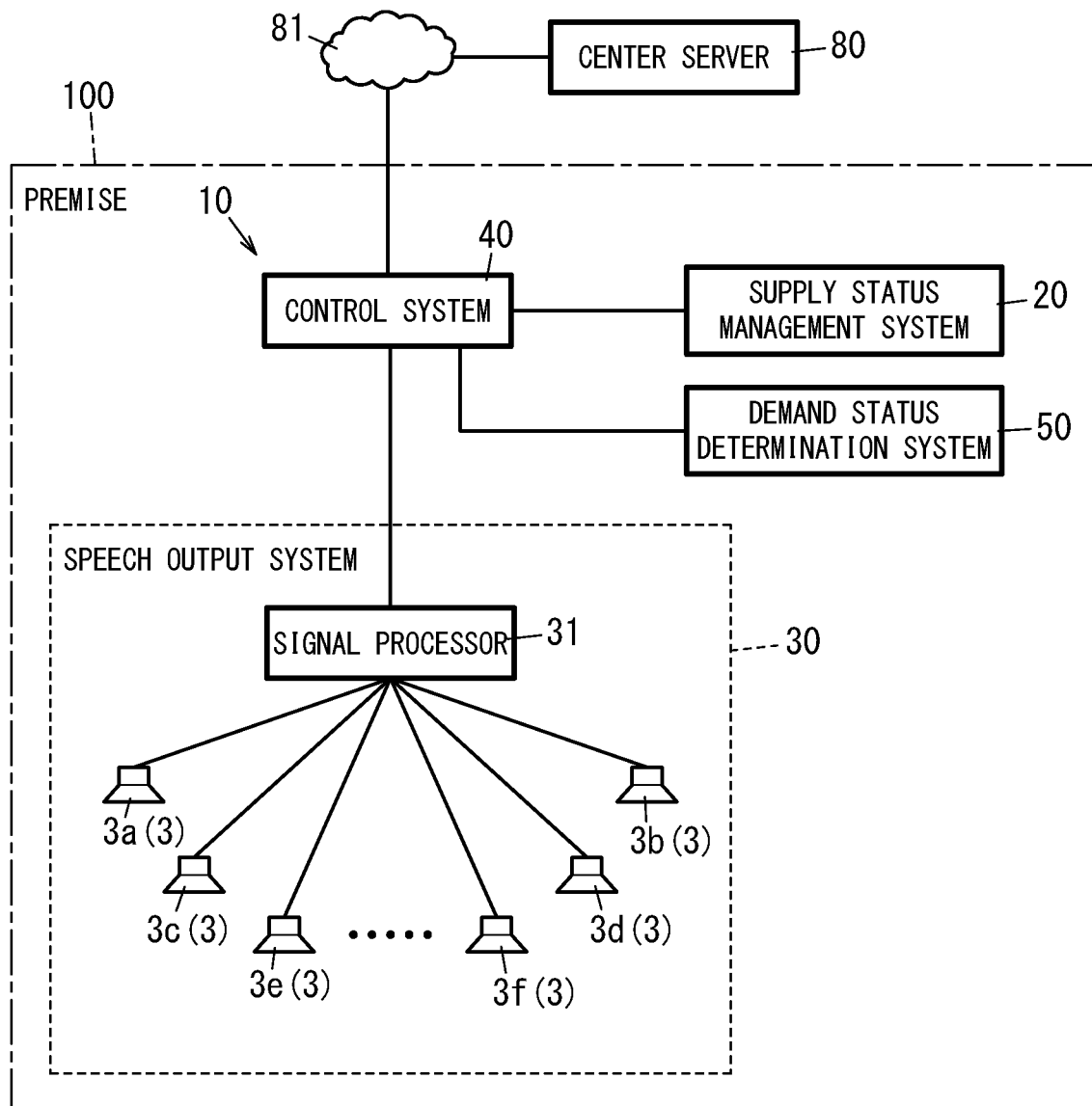
FIG. 2 is a system configuration diagram illustrating the product suggestion system.

Here, the speech output system 30 has a plurality of directional loudspeakers 3a, 3b, 3c, . . . , as shown in FIG. 2. When the plurality of directional loudspeakers 3a, 3b, 3c . . . are not particularly distinguished from one another, each of the plurality of directional loudspeakers 3a, 3b, 3c . . . is hereinafter referred to as a "directional loudspeaker 3". Each directional loudspeaker 3 outputs a sound having a relatively sharp directionality such that the sound is output to a person (customer 9) in a relatively narrow audible area in a limited manner, which will be described in "(2.1) Speech Output System". The speech output system 30 further includes a signal processor 31 configured to control the plurality of directional loudspeakers 3.

The plurality of directional loudspeakers 3 are installed in the premise 100. Each of the plurality of directional loudspeakers 3 produces a speech output directed to the audible area 300 defined by at least one of a presence area of the customer 9 or a selling space as a unit in the premise 100. As used herein "presence area of the customer 9" means an area in which the customer 9 is present, and one presence area may be defined for one customer 9 or one presence area may be defined for a plurality of customers 9. As used herein "selling space" means a place in which the products 5 are displayed for sales in the premise 100, and one selling space may be laid out for each one kind of product(s) 5, or one selling space may be laid out for a plurality of kinds of products 5. When the premise 100 is a supermarket as in the present embodiment, for example, selling spaces such as a selling space for beef, a selling space for poke, and a selling space for chicken are laid out for each of a plurality of kinds of products 5 classified into the same type.

That is, the plurality of directional loudspeakers 3 are associated with at least one of the presence areas of the customer 9 or the selling spaces in the premise 100. In the present embodiment, the plurality of directional loudspeakers 3 are associated, on a one-to-one basis, with the selling spaces in which the plurality of kinds of products 5 are displayed. That is, "one selling space is associated with one directional loudspeaker 3. A set of two or more kinds of products 5 displayed in one selling space corresponding to one directional loudspeaker 3 is hereinafter also referred to as a "product group". The signal processor 31 controls the plurality of directional loudspeakers 3 individually such that each directional loudspeaker 3 is caused to produce a speech output of arbitrary information. It is of course possible for the signal processor 31 to cause two or more directional loudspeakers 3 to produce speech outputs of the same information pieces. Each of the directional loudspeakers 3 is installed in a specific location, such as a place in front of a corresponding product group, in the premise 100 is the audible area 300. In the present embodiment, as an example, the directional loudspeaker 3 produces a speech output of information such as the price of the products 5 included in the corresponding product group. For example, the signal processor 31 causes the directional loudspeaker 3a corresponding to the product group including the product 5a to produce a speech output of the price of the product 5a. However, it is sufficient that the speech output system 30 has at least one directional loudspeaker 3, and it is not an essential configuration that the speech output system 30 has the plurality of directional loudspeakers 3.

Based on the supply information representing the supply status of the target product, the control system 40 performs control of the speech output system 30 such that the directional loudspeaker 3 corresponding to the target product produces a speech output of the product information regarding the target product. Here, the control for causing the directional loudspeaker 3 to produce the speech output includes, for example, a process of determining, based on the supply information, the contents of the product information to be produced as the speech output from the directional loudspeaker 3. The control for causing the directional loudspeaker 3 to produce the speech output may also include, a process of determining to which of the plurality of audible areas 300 defined in the premise 100 the product information is to be produced as the speech output, a process of determining whether or not the directional loudspeaker 3 is caused to produce the speech output, or the like based on the supply information.

In short, the product suggestion system 10 according to the present embodiment causes the directional loudspeaker 3 to produce a speech output of the product information regarding the target product including at least one kind of product(s) 5 of the plurality of kinds of products 5 based on the supply information acquired from the supply status management system 20. Here, since the audible area 300 of the directional loudspeaker 3 is defined in a specific location in the premise 100, it is possible to let the product information regarding the target product be targeted at and heard by only a person (customer 9) present in the specific location in the premise 100. Therefore, the information regarding the target product is to be targeted at and audibly notified to only the customer 9 present in the specific location in the premise 100. Accordingly, the product suggestion system 10, for example, enables a product suggestion in consideration of circumstances of a seller, such as a stock-out or an overstock.

In addition, since the control system 40 controls the speech output system 30 based on the supply information acquired from the supply status management system 20, the processing load of the control system 40 can be reduced as compared to a case where the control system 40 also manages the supply information. Consequently, the speed of the process by the control system 40 can be increased, the memory resource of the control system 40 can be reduced, and the like.

Further, in the product suggestion system 10 according to the present embodiment, the control system 40 is configured to cause the directional loudspeaker 3 to produce a speech output of the product information based on demand information in addition to the supply information. As used herein, "demand information" is information acquired from a demand status determination system 50 and regarding the customer 9 in the audible area 300. The demand information is information representing, for example, at least one of the presence/absence of the customer 9, the number of customers 9, the attribute of the customer 9, or the emotion of the customer 9 in the audible area 300.

The product suggestion system 10 enables a product suggestion in consideration of not only circumstances of a seller, such as a stock-out or an overstock but also the demand of the customers 9. That is, in the product suggestion system 10, matching of supply and demand enables the product suggestion to be performed in consideration of the balance between the supply and the demand.

(2) Details

The product suggestion system 10 according to the present embodiment will be described in detail below. In the following description, it is assumed that the product suggestion system 10 includes the speech output system 30, the control system 40, the supply status management system 20, and the demand status determination system 50. However, the supply status management system 20 and the demand status determination system 50 are not necessarily included in components of the product suggestion system 10 and do not have to be included in the components of the product suggestion system 10.

(2.1) Speech Output System (2.1.1) Configuration

Figure 3:
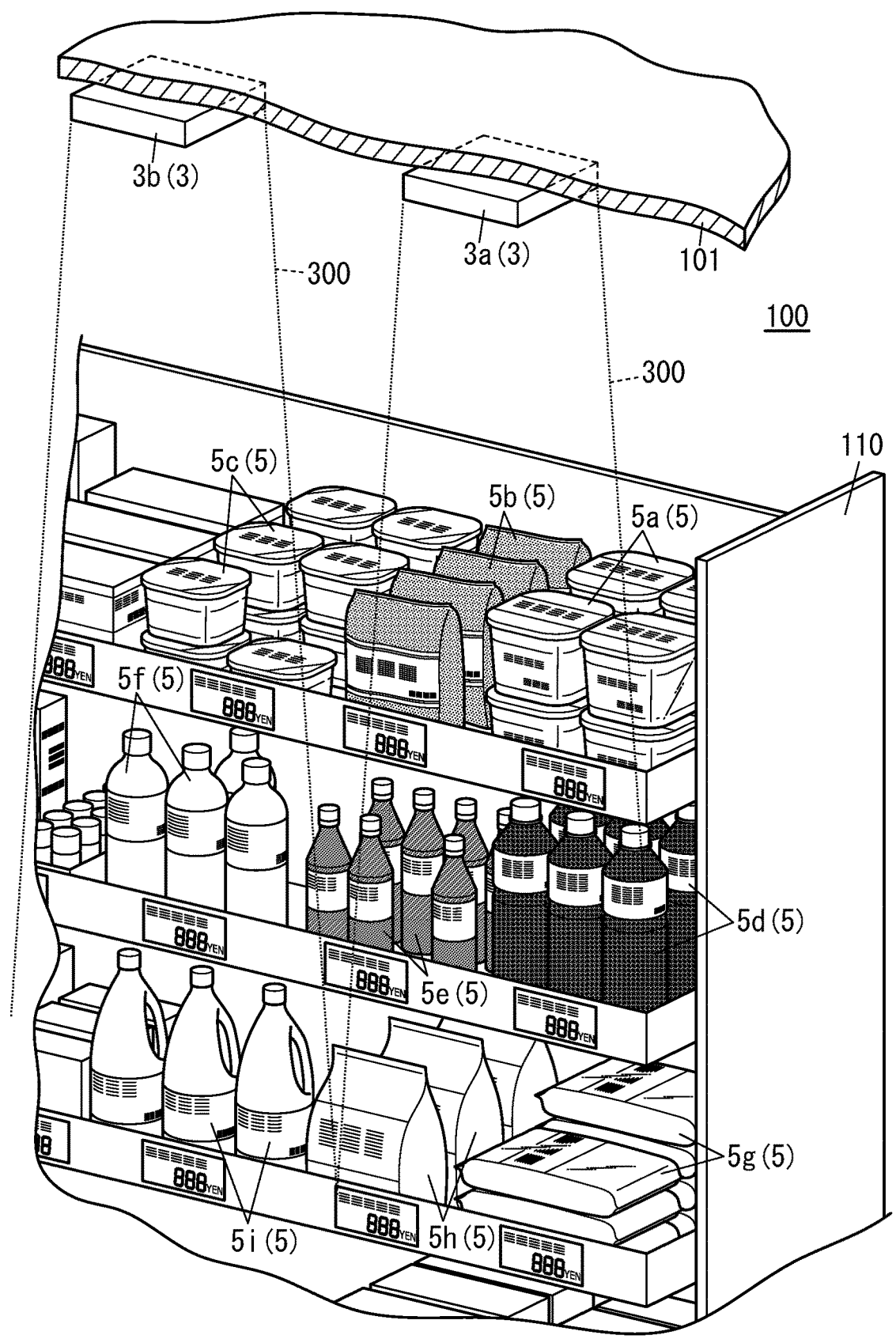
FIG. 3 is a perspective view illustrating an installation state of the product suggestion system.

As illustrated in FIGS. 2 and 3, the speech output system 30 has a plurality of directional loudspeakers 3a, 3b, 3c, . . . , and the signal processor 31. In the present embodiment, each of the plurality of directional loudspeakers 3 is also called, for example, a parametric loudspeaker or a super directional loudspeaker and is an acoustic system configured to use an ultrasonic wave as a carrier wave so as to produce a sound having a relatively sharp directionality. The plurality of directional loudspeakers 3 are configured to communicate with the signal processor 31 and produce a speech output of information in accordance with speech signals transmitted from the signal processor 31. The communication scheme between each of the directional loudspeakers 3 and the signal processor 31 is, for example, a wired communication for performing serial communication via a communication line. In the present embodiment, a power supply for operation of the directional loudspeakers 3 is secured by supplying power from a system power supply (commercial power grid) to the directional loudspeakers 3.

The directional loudspeaker 3 is configured to emit, to air, a modulation wave obtained by modulating a carrier wave including an ultrasonic wave with an audible sound. In the directional loudspeaker 3, the modulation wave is influenced by the non-linearity of the elasticity characteristics of air. Therefore, as the modulation wave proceeds through the air, distortion occurs in the waveform of the ultrasonic wave serving as the carrier wave, and ultrasonic wave components are attenuated and audible sound components are regenerated. That is, in the course of propagation of the modulation wave in air, the distortion occurs due to the non-linearity of the air, and an imaginary sound source is generated in the air, and thereby, the audible sound is demodulated (self-demodulation). In general, the sonic wave is less likely to spread with respect to a sound axis (center axis in a traveling direction of the sonic wave) as the frequency of the sonic wave increases, and therefore, the radiation angle of the sonic wave becomes smaller and the directionality of the sonic wave becomes higher. Therefore, the directional loudspeaker 3 using an ultrasonic wave having a frequency (for example, 20 kHz) sufficiently higher than that of the audible sound as a carrier wave emits a sonic wave (modulation wave) having high directionality. In addition, the directionality of the audible sound generated in the course of propagation of the modulation wave under the influence of the non-linearity of air is also high as in the case of the directionality of the modulation wave.

Figure 4:
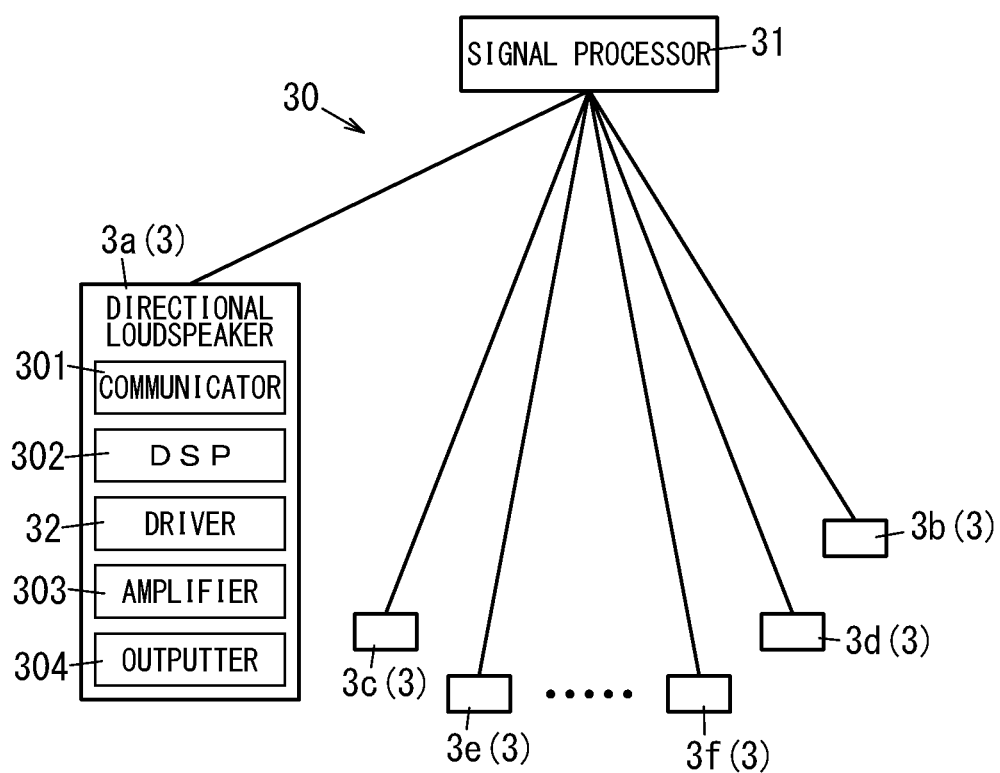
FIG. 4 is a system configuration diagram illustrating a speech output system in the product suggestion system.

More specifically, as illustrated in FIG. 4, the directional loudspeaker 3 includes a communicator 301, a Digital Signal Processor (DSP) 302, an amplifier 303, and an outputter 304. The communicator 301 has a communication function of communicating with the signal processor 31. The DSP 302 receives the speech signal from the signal processor 31 and modulates a carrier wave signal with the speech signal to generate a modulation wave signal. The amplifier 303 amplifies the modulation wave signal such that a modulation wave is emitted at a sound pressure sufficient to cause distortion in the waveform of the carrier wave due to the non-linearity of air, and the amplifier 303 then outputs the modulation wave signal to the outputter 304. The outputter 304 receives the modulation wave signal thus amplified and emits the modulation wave into air. Here, the outputter 304 has a plurality of ultrasonic transducers each of which is configured to convert an electric signal into an ultrasonic wave and output the ultrasonic wave. The plurality of ultrasonic transducers are arranged side by side on a flat plane along a front surface of a body of the directional loudspeaker 3. For example, the outputter 304 includes ten ultrasonic transducers aligned in two rows each including five ultrasonic transducers. In this configuration, modulation waves using ultrasonic waves as carrier waves are emitted from the plurality of ultrasonic transducers, and thereby, the modulation waves each having high directionality are emitted from the front surface of the directional loudspeaker 3. In FIG. 4, the interior configuration of only one directional loudspeaker 3a of the plurality of directional loudspeakers 3a, 3b, 3c . . . is illustrated, but the other directional loudspeakers 3 have similar configurations.

The directional loudspeaker 3 is, for example, installed downward on a ceiling 101 (see FIG. 3) of the premise 100. Thus, the audible area 300 (see FIG. 3) of the directional loudspeaker 3 can be defined in the space below the directional loudspeaker 3. The audible area 300 is a relatively narrow area having a diameter of about several tens of centimeters to several meters below the directional loudspeaker 3. Then, when the customer 9 moving in the premise 100 enters the audible area 300 below the directional loudspeaker 3, it is possible to let a sound (audible sound) output from the directional loudspeaker 3 be heard by the customer 9.

For example, the configuration disclosed in JP 5288080 B is preferably applied to the directional loudspeaker 3.

Figure 5A:
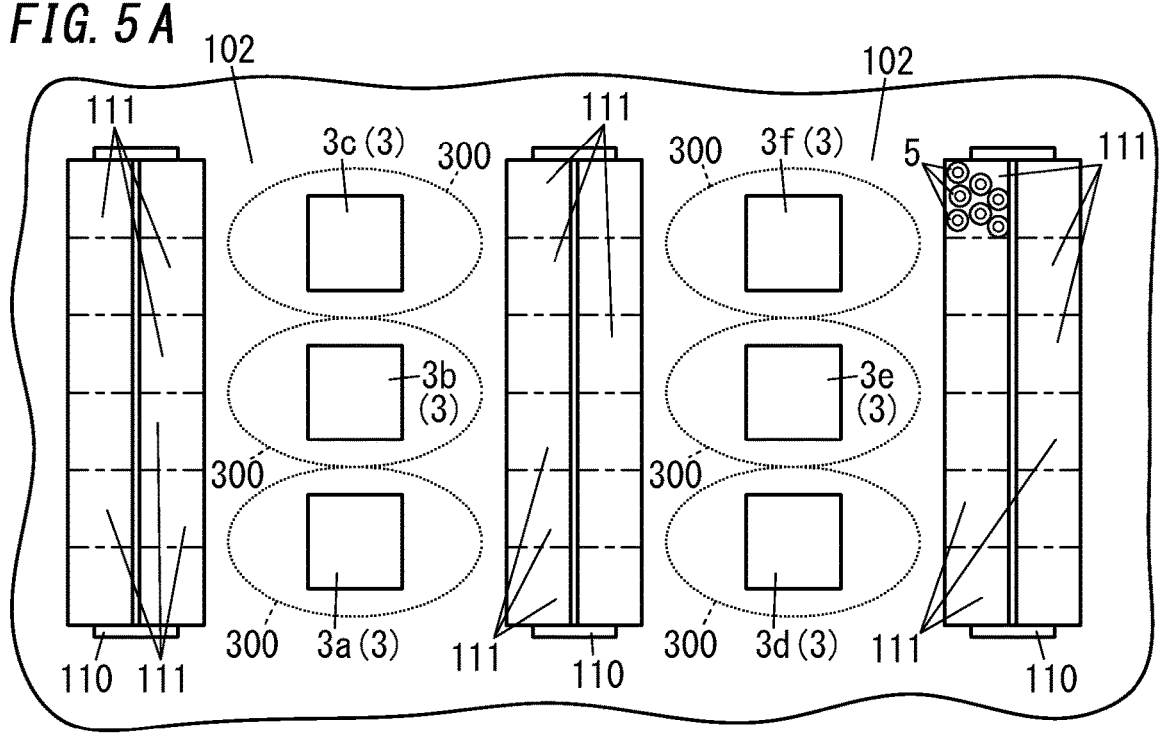
FIG. 5A is a plan view illustrating an installation state of the speech output system.
Figure 5B:
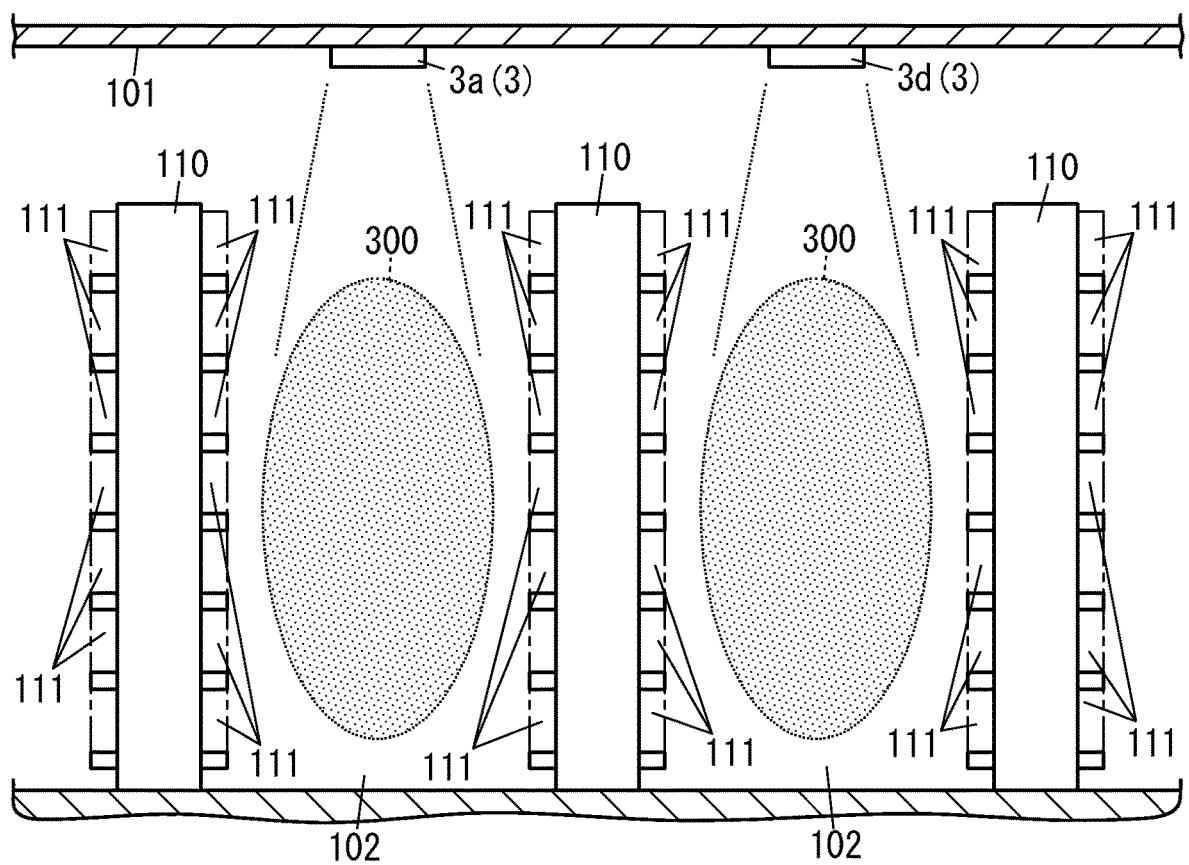
FIG. 5B is a front view illustrating the installation state of the speech output system.

The plurality of directional loudspeakers 3 are associated, on a one-to-one basis, with product groups each including two or more products 5 and are installed in the ceiling 101 of the premise 100. That is, as shown in FIGS. 5A and 5B, the directional loudspeakers 3 are installed above aisles 102 in front of the display racks 110 such that front areas (selling spaces) of the plurality of kinds of products 5 arranged on the display racks 110 become the audible areas 300. Each display rack 110 has a plurality of display spaces 111. Each display rack 110 has tiers each having a space divided in right and left directions (upward and downward directions in FIG. 5A) into a plurality of display spaces 111. That is, the plurality of display spaces 111 are arranged in the upward and downward directions (upward and downward directions in FIG. 5B) and the right and left directions (upward and downward directions in FIG. 5A) of each display rack 110. Then, the products 5 arranged in the display spaces 111 facing the audible area 300 of a corresponding one of the directional loudspeakers 3 will be associated with the corresponding one of the directional loudspeakers 3. In the present embodiment, in one display rack 110, the products 5 in two columns adjoining to each other in the right and left directions (upward and downward directions in FIG. 5A) are associated with one directional loudspeaker 3. That is, in the present embodiment, as shown in FIG. 3, the directional loudspeaker 3a corresponding to a product group including products 5a, 5b, 5d, 5e, 5g, and 5h is installed so as to define an audible area 300 in the selling space of the products 5a, 5b, 5d, 5e, 5g, and 5h. Similarly, the directional loudspeaker 3b corresponding to a product group including products 5c, 5f, and 5i is installed to define an audible area 300 in the selling space of the products 5c, 5f, and 5i.

Here, the signal processor 31 is a stationary device installed in a fixed position in the premise 100. The signal processor 31 is capable of communicating with all of the plurality of directional loudspeakers 3 in the premise 100. The communication between the signal processor 31 and at least some of the directional loudspeakers 3 may be performed via a relay.

In the speech output system 30 having the above-described configuration, the signal processor 31 can transmit the speech signal to a specific directional loudspeaker 3 to cause the specific directional loudspeaker 3 to produce speech outputs of various contents. The directional loudspeaker 3 produces speech outputs, such as "Flour produced by XYZ Foods is 324 yen including tax" and "Salad oil produced by AAA Foods is 432 yen including tax", of product information including the product names and the like (manufacturers, item names, and the like) and the prices of a corresponding product 5. Additionally, the directional loudspeaker 3 may produce speech outputs, such as "Newly released" and "Bargain of the month", of product information for advertisement of the product 5.

In addition, when an event related to a product 5 occurs by limited-time sale or the like, a speech output content from the directional loudspeaker 3 corresponding to the product 5 is changed, which will be described in detail in "(2.4.3) Product Information Updating". For example, the speech output content "Flour produced by XYZ Foods is 324 yen including tax" is changed to "Special price only for now. Flour produced by XYZ Foods is 216 yen including tax".

Incidentally, in the present embodiment, the directional loudspeaker 3 further includes a driver 32 (see FIG. 4). The driver 32 is a device configured to move the audible area 300 of each of the plurality of directional loudspeakers 3. The driver 32 moves the audible area 300 of each directional loudspeaker 3 by, for example, so-called mechanical scanning in which the orientation of the directional loudspeaker 3 is mechanically changed by a motor or the like. The driver 32 may be configured to move the audible area 300 of each directional loudspeaker 3 by, for example, an electronic scanning method without changing the orientation of the directional loudspeaker 3. The electronic scanning method will be described in detail in "(2.1.2) Electronic Scanning Method".

(2.1.2) Electronic Scanning Method

A configuration in which the driver 32 moves the audible area 300 of the directional loudspeaker 3 by the electronic scanning method will be described below in more detail with reference to FIGS. 6A and 6B.

Figure 6A:
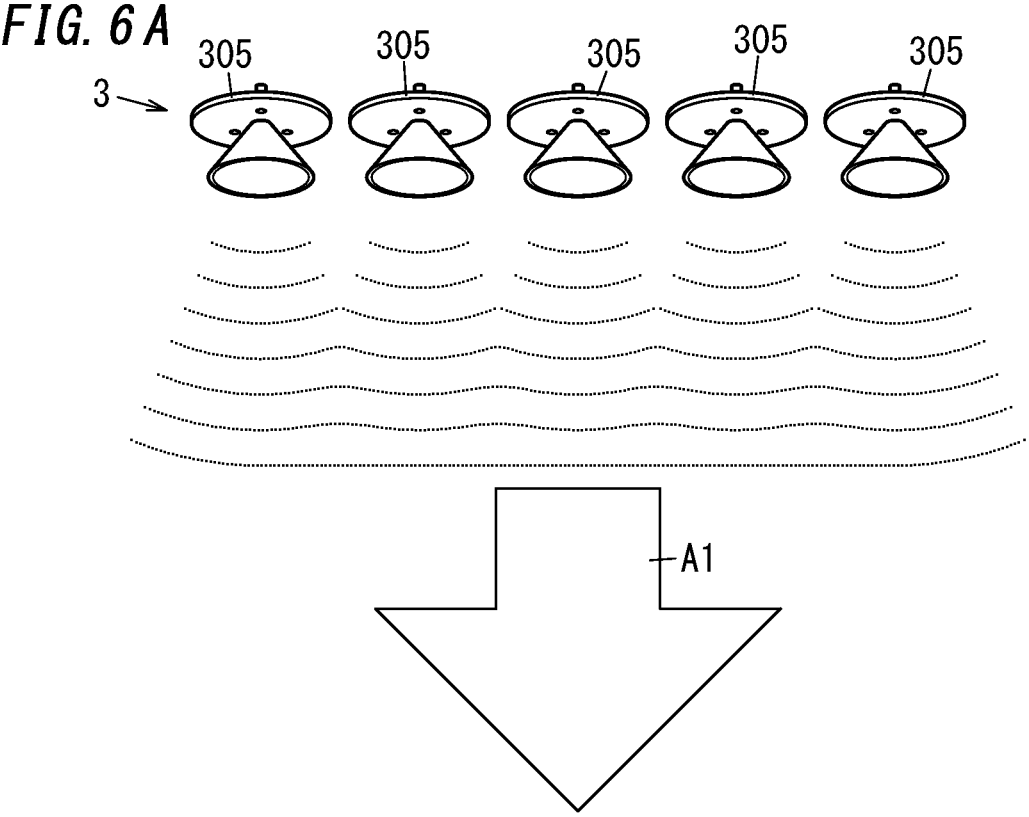
FIG. 6A is a conceptual view illustrating directionality in a fixed position mode of a directional loudspeaker in the product suggestion system.

FIG. 6A is a conceptual view showing the directionality of the directional loudspeaker 3 which is in a fixed position mode and which is used in the product suggestion system 10 according to the present embodiment. As shown in FIG. 6A, the directional loudspeaker 3 has a structure in which a plurality of (in the example illustrated in FIG. 6A, five) ultrasonic transducers 305 are linearly arranged. In the fixed position mode, the plurality of ultrasonic transducers 305 simultaneously (at the same time) emit modulation waves obtained by modulating a carrier wave including an ultrasonic wave with an audible sound (speech signal). Then, the modulation waves each having high directionality are emitted in a direction indicated by arrow A1 in FIG. 6A. In this case, sound axes of the modulation waves (axes along the arrow A1) are orthogonal to a direction in which the plurality of ultrasonic transducers 305 are aligned (front surface of the body of the directional loudspeaker 3).

Figure 6B:
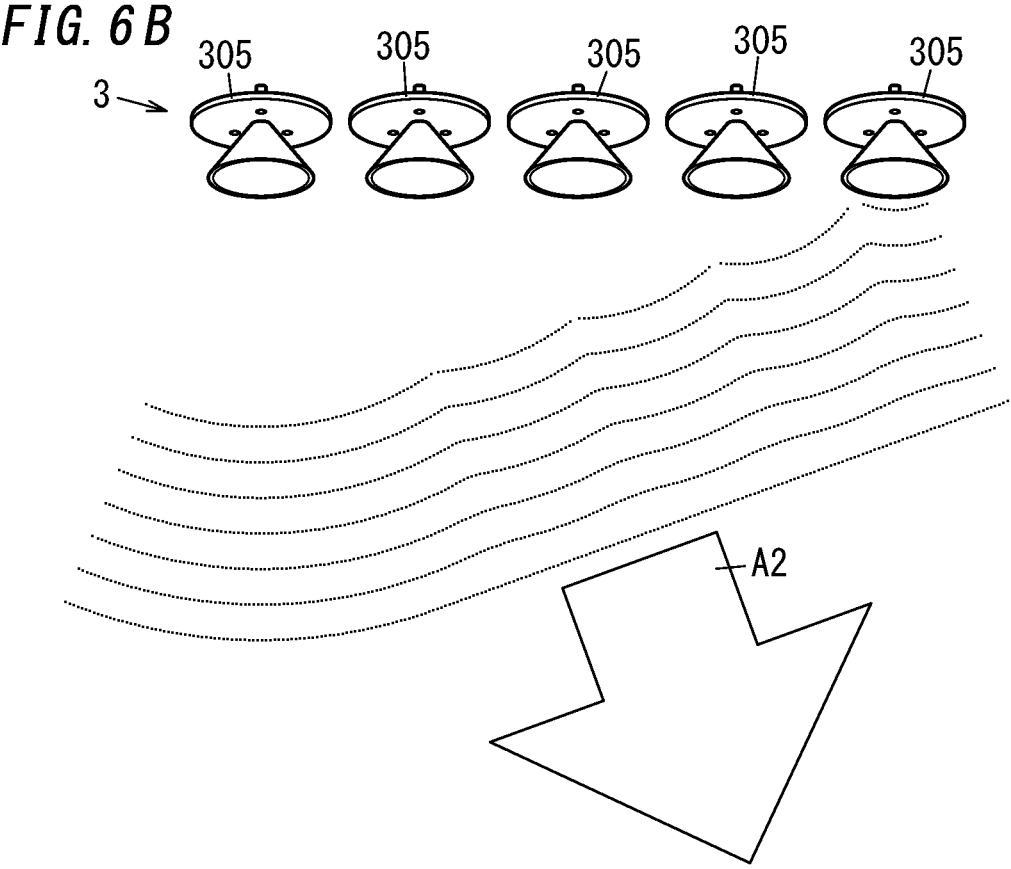
FIG. 6B is a conceptual view illustrating directionality in a movable mode of the directional loudspeaker in the product suggestion system.

FIG. 6B is a conceptual view showing the directionality of the directional loudspeaker 3 which is in a movable mode and which is used in the product suggestion system 10 according to the present embodiment. In the movable mode, the plurality of ultrasonic transducers 305 in the directional loudspeaker 3 emit the modulation waves obtained by modulating the carrier wave including the ultrasonic wave with the audible sound (speech signal) at a predetermined time difference (at different times) in the direction in which the plurality of ultrasonic transducers 305 are aligned. Then, the modulation waves each having a high directionality are emitted in the direction indicated by arrow A2 in FIG. 6B. In this case, the sound axes of the modulation waves (axes along the arrow A2) are tilted with respect to a line normal to the direction in which the plurality of ultrasonic transducers 305 are aligned (front surface of the body of the directional loudspeaker 3). As in the case of the movable mode, providing time differences to timings of emission of the modulation waves from the plurality of ultrasonic transducers 305 enables the audible area 300 of the directional loudspeaker 3 to be moved.

The audible area 300 of the directional loudspeaker 3 is moved by the electronic scanning method, and thereby, the driver 32 no longer needs a mechanism (including motor or the like) for mechanical scanning of mechanically changing the orientation of the directional loudspeaker 3. Alternatively, the driver 32 can move the audible area 300 in a complicated manner by using the electronic scanning method and the mechanical scanning method in combination. When the audible area 300 moves to track the customer 9, it is particularly useful that the audible area 300 can be moved in a complicated manner, which will be described in detail in "(2.4.3) Human Sensing Mode".

(2.2) Control System

Figure 7:
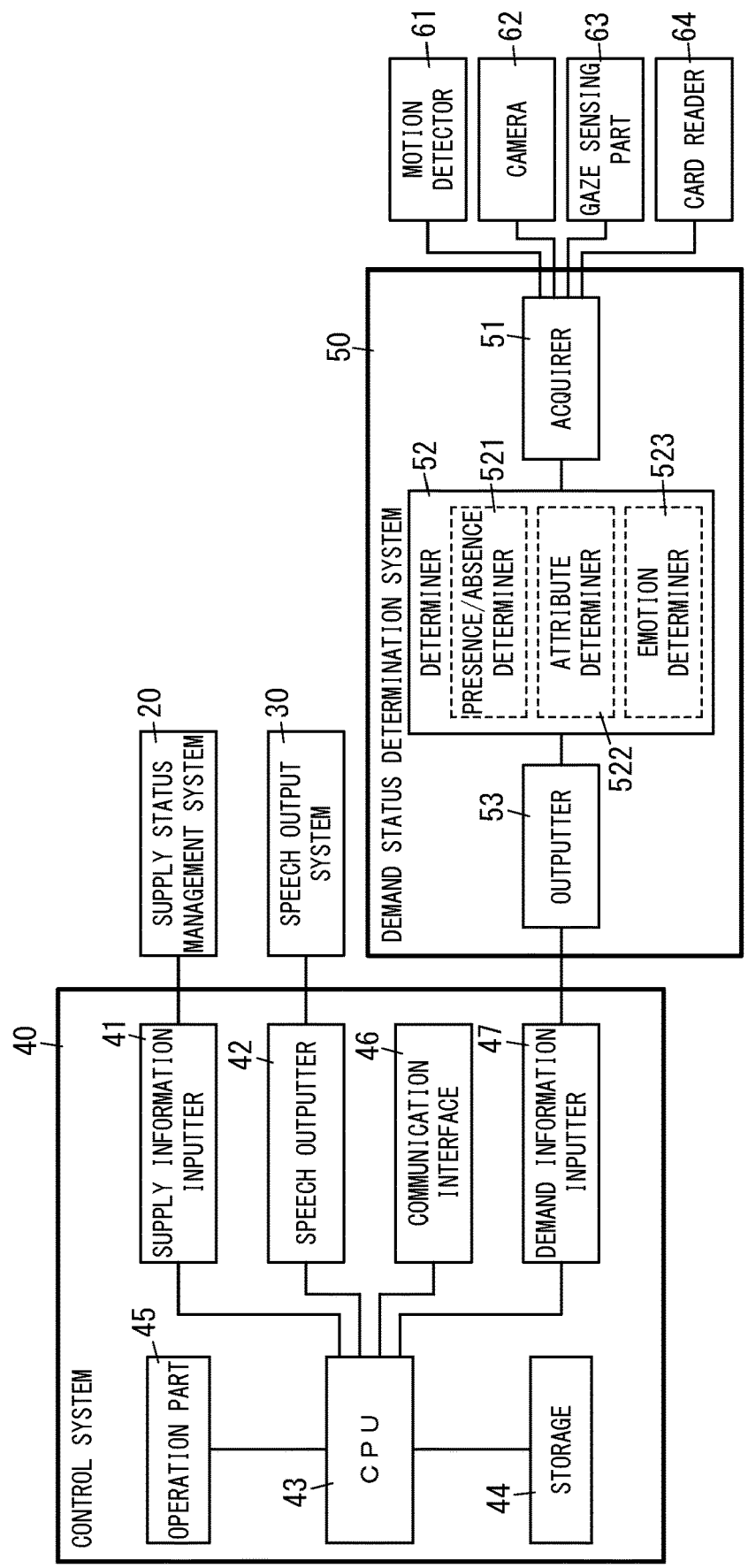
FIG. 7 is a system configuration diagram illustrating configurations of a control system and a demand status determination system of the product suggestion system.

As illustrated in FIG. 7, the control system 40 includes a supply information inputter 41, a speech outputter 42, a Central Processing Unit (CPU) 43, a storage 44, and an operation part 45. In addition, the control system 40 further includes a communication interface 46 and a demand information inputter 47. In this embodiment, the control system 40 is a stationary computer installed in a fixed position in the premise 100.

The supply information inputter 41 has a communication function of communicating with the supply status management system 20. The supply information inputter 41 acquires supply information representing the supply status of the target product from the supply status management system 20. The supply information inputter 41 acquires the supply information at any time or periodically. The supply status management system 20 is, for example, a POS system configured to manage at least one of the quantity of stock or the sales quantity of the plurality of kinds of products 5 in the premise 100. Further, the supply status management system 20 manages, for example, product information regarding the product 5, such as the target sales volume, the target achievement rate, the product name, the price, and the information of the limited-time sale of the target product in the premise 100. In the present embodiment, the information acquired by the supply information inputter 41 from the supply status management system 20 includes at least information of both the quantity of stock and the sales volume. The quantity of stock and the sales volume for all of the plurality of kinds of products 5 for sale in the premise 100 are managed for each product 5. The sales volume is counted for each business day, week, month, or time zone of the premise 100, for example.

The speech outputter 42 has a communication function of communicating with the speech output system 30 (signal processor 31). The CPU 43 controls components, such as the supply information inputter 41 and the speech outputter 42, of the control system 40. For example, the CPU 43 performs a process of determining the speech output contents of the plurality of directional loudspeakers 3 in the speech output system 30. As a result, the control system 40 collectively controls the plurality of directional loudspeakers 3 included in the speech output system 30. In other words, in the product suggestion system 10 of the present embodiment, the control system 40 unitarily manages which information (product information) is to be output by the plurality of directional loudspeakers 3.

The storage 44 stores at least a correspondence relationship of the products 5 with respect to the directional loudspeakers 3. In the present embodiment, it is assumed, for example, that the correspondence relationship shown in Table 1 below is stored in the storage 44.

TABLE 1

| | Product | | | | | | | | |
|---|---|---|---|---|---|---|---|---|---|
| | 5a | 5b | 5c | 5d | 5e | 5f | 5g | 5h | 5i ... |
| Directional Loudspeaker | 3a | 3a | 3b | 3a | 3a | 3b | 3a | 3a | 3b ... |

In the present embodiment, the directional loudspeakers 3 are associated with the products 5 in this way, but the present invention is not limited to this configuration. For example, the products 5 may be associated with the directional loudspeaker 3 for each display space 111 of the display rack 110. In this case, for example, a unique identifier (address) is given to each of the plurality of display spaces 111, and the correspondence relationship among the address of each display space 111, the products 5, and the directional loudspeaker 3 is stored in the storage 44. The storage 44 stores product information regarding each product 5. Based on the product information, the CPU 43 of the control system 40 determines the speech output contents of the plurality of directional loudspeakers 3 in the speech output system 30.

The operation part 45 is, for example, a touch panel display, a keyboard, or a pointing device such as a mouse for receiving an operation given by a person (e.g., a sales clerk). The CPU 43 performs, for example, a process of registering or changing the correspondence relationship described above in response to the operation given to the operation part 45 by a person. The communication interface 46 has a communication function of communicating with, for example, a center server 80 (see FIG. 2). The center server 80 is, for example, a device that is installed at an operating source of the premise 100 and that performs a unified management of the statuses of the plurality of retail establishments including the premise 100. The communication interface 46 is configured to communicate with the center server 80 via a network 81 such as the Internet. Thus, the control system 40 can cooperate with an external device of the product suggestion system 10, such as the center server 80.

The demand information inputter 47 has a communication function of communicating with the demand status determination system 50. The demand information inputter 47 acquires demand information regarding the customer 9 in the audible area 300 from the demand status determination system 50. The demand information inputter 47 acquires the demand information at any time or periodically. The demand status determination system 50 generates the demand information representing at least one of the presence/absence of the customer 9, the number of customers 9, the attribute of the customer 9, or the emotion of the customer 9 in the audible area 300.

In the present embodiment, the demand information includes at least the attribute information and the emotion information. The attribute information is information representing the attribute of the customer 9 present in the audible area 300. As used herein, "attribute information" is information representing the attribute of the customer 9, such as a customer Identification (ID), gender, age-group, race (nationality), and a household composition, which identify the customer 9. The emotion information is information representing the emotion of the customer 9 present in the audible area 300. As used herein "emotion information" is information representing the emotions of the customer 9, such as surprise, happiness, boredom, and sadness. The emotion information is represented by, for example, two values of an arousal level indicating the level of arousal of the customer 9 and a valence level indicating the level of comfort of the customer 9. The demand status determination system 50 will be described in detail in "(2.3) Demand Status Determination System".

Here, when the plurality of customers 9 are present in one audible area 300, the control system 40 preferably acquires attribute information corresponding to the largest number of attribute information pieces representing the attribute of the plurality of customers 9 by the demand information inputter 47. Similarly, the control system 40 preferably acquires, via the demand information inputter 47, the emotion information which is predominant among emotion information pieces representing the emotions of the plurality of customers 9.

The control system 40 is configured to cause, based on the supply information and the demand information, the directional loudspeaker 3 to produce a speech output of the product information. Here, in the control system 40, the CPU 43 determines contents of the product information based on the supply information and the demand information. In addition, in the control system 40, the CPU 43 determines, based on the supply information and the demand information, to which of the plurality of audible areas 300 defined in the premise 100 the speech output of the product information is to be directed.

Here, based on a correspondence relationship between each of the plurality of kinds of products 5 and each of the attribute information pieces, the control system 40 defines at least one kind of product(s) 5 of the plurality of kinds of products 5 as the target product, the at least one kind of product(s) 5 corresponding to the attribute information included in the demand information. The correspondence relationship between each of the plurality of kinds of products 5 and each of the attribute information pieces is stored in the storage 44.

Based on a correspondence relationship between each of the plurality of kinds of products 5 and each of the emotion information pieces, the control system 40 defines at least one kind of product(s) 5 of the plurality of kinds of products 5 as the target product, the at least one kind of product(s) 5 corresponding to the emotion information included in the demand information. The correspondence relationship between each of the plurality of kinds of products 5 and each of the emotion information pieces is stored in the storage 44.

The above-described configuration enables the control system 40 to control the speech output system 30 based on the supply information acquired from the supply status management system 20 and the demand information acquired from the demand status determination system 50. Thus, the control system 40 can, based on at least the supply information representing the supply status of the target product, cause the directional loudspeaker 3 to produce a speech output of the product information regarding the target product. Here, control of the speech output system 30 by the control system 40 includes, for example, a process of determining the contents of the product information to be produced as a speech output from the directional loudspeaker 3. Moreover, the control of the speech output system 30 by the control system 40 includes, a process of determining to which of the plurality of audible areas 300 defined in the premise 100 the product information produced as the speech output is to be directed, a process of determining whether or not the directional loudspeaker 3 is caused to produce the speech output, or the like.

Here, the control system 40 may store the contents of the product information to be produced as the speech output from the directional loudspeaker 3 for each product 5 in the storage 44 or may accordingly generate the contents. When the control system 40 generates the contents of the product information, information regarding the product 5, such as the product name and the price acquired from the supply status management system 20 (POS system) is fit to, for example, a text sentence of a fixed form to generate the contents of the product information. In this case, the control system 40 causes the directional loudspeaker 3 to produce a speech output of the product information generated by, for example, voice synthesis (text-to-speech reading).

(2.3) Demand Status Determination System
(2.3.1) Configuration

As illustrated in FIG. 7, the demand status determination system 50 includes an acquirer 51, a determiner 52, and an outputter 53. To the demand status determination system 50, a motion detector 61, a camera 62, a gaze sensing part 63, and a card reader 64 as peripheral devices are connected. Based on inputs from these peripheral devices, the demand status determination system 50 generates demand information representing at least one of the presence/absence of the customer 9, the number of customers 9, the attribute of the customer 9, or the emotion of the customer 9 in the audible area 300.

The acquirer 51 is connected to the motion detector 61, the camera 62, the gaze sensing part 63, and the card reader 64. The acquirer 51 acquires, from the motion detector 61, sensing results by the motion detector 61, that is, the information of the presence/absence of a person (the customer 9) in the sensing area of the motion detector 61. The acquirer 51 acquires, from the camera 62, an image captured by the camera 62, that is, an image of an image capturing area of the camera 62. The acquirer 51 acquires, from the gaze sensing part 63, sensing results by the gaze sensing part 63, that is, the information of the gaze of a person (the customer 9) in the sensing area of the gaze sensing part 63. The acquirer 51 acquires, from the card reader 64, for example, customer information read from various cards owned by the customer 9.

Specifically, the motion detector 61 uses the audible area 300 of each of the plurality of directional loudspeakers 3 as a sensing area and detects the presence/absence of a person (customer 9) in this sensing area (audible area 300). Cameras 62 are installed throughout the premise 100. Each camera 62 sets the audible area 300 of each of the plurality of directional loudspeakers 3 as an image capturing area and captures an image of the customer 9 present in the image capturing area (audible area 300). The gaze sensing part 63 uses the audible area 300 of each of the plurality of directional loudspeakers 3 as a sensing area and detects the gaze of the customer 9 present in this sensing area (audible area 300). The gaze sensing part 63 is realized by, for example, a gaze sensor using an image sensor and senses that the customer 9 is paying attention to a product 5 when the gaze of the customer 9 is directed toward the product 5 for a period longer than or equal to a definite time period. The card reader 64 is provided to, for example, a shopping cart, a shopping basket, or the like used by the customer 9 in the premise 100. The card reader 64 reads out customer information from, for example, a membership card, a loyalty card, a credit card, or the like and outputs the customer information to the demand status determination system 50.

Here, the motion detector 61 may be, for example, a heat ray type motion sensor, or the directional loudspeaker 3 may be used also as the motion detector 61. That is, since the directional loudspeaker 3 includes the ultrasonic transducers as described above, it is possible not only to convert the electric signals into the ultrasonic waves and output (radiate) the ultrasonic waves but also to receive the ultrasonic waves and convert the ultrasonic waves into the electric signal. Therefore, the directional loudspeaker 3 can detect the presence/absence of a person (customer 9) in the audible area 300 based on the time from transmission of the ultrasonic wave toward the audible area 300 to reception of the ultrasonic wave. The directional loudspeaker 3 can also sense a moving object in the audible area 300 based on the Doppler effect to sense the presence/absence of the customer 9 in the audible area 300. The configuration in which the directional loudspeaker 3 is used also as the motion detector 61 will be described in detail in "(2.3.2) Human Sensing".

The determiner 52 includes a presence/absence determiner 521, an attribute determiner 522, and an emotion determiner 523. The determiner 52 includes a computer as a main component, and the computer includes a processor and memory. The processor executes a program stored in the memory, thereby causing the computer to function as the determiner 52 (the presence/absence determiner 521, the attribute determiner 522, and the emotion determiner 523).

The presence/absence determiner 521 determines whether or not the customer 9 is present in the audible area 300 of each of the plurality of directional loudspeakers 3, and the presence/absence determiner 521 generates presence/absence information representing the presence/absence of the customer 9. Here, the presence/absence determiner 521 determines the presence/absence of the customer 9 for each audible area 300 and determines, from the sensing result by the motion detector 61, in which audible area 300 the customer 9 is present. When a plurality of customers 9 are present in one audible area 300, the presence/absence determiner 521 determines the presence/absence information inclusively of the number of customers 9 in this audible area 300.

The presence/absence determiner 521 may, for example, track the location of a shopping cart or the like provided with the card reader 64 in the premise 100 or specify the location of the customer 9 in the premise 100 from an image captured by the camera 62 to determine the presence/absence of the customer 9 in the audible area 300. Further, in a small-scale retail establishment or the like, the presence/absence determiner 521 may determine that the customer 9 is present in the audible area 300 of the directional loudspeaker 3 as long as the customer 9 is present in the premise 100.

The attribute determiner 522 determines the attribute of the customer 9 present in the audible area 300 of each of the plurality of directional loudspeakers 3 and generates attribute information representing the attribute. The attribute information is obtained by performing a facial authentication process or the like on the image of the captured customer 9 captured by the camera 62. Here, the attribute determiner 522 determines the attribute of the customer 9 for each audible area 300. That is, if the presence/absence determiner 521 determines that the customer 9 is present in the audible area 300, the attribute of this customer 9 is determined by the attribute determiner 522.

Further, the attribute determiner 522 may determine, for example, likes and tastes and product purchase history of the customer 9 as attribute information from the outputs from the gaze sensing part 63, the card reader 64, and the like. For example, the attribute determiner 522 can specify the product 5 to which the customer 9 is paying attention from the sensing result by the gaze sensing part 63, and the attribute determiner 522 can determine the likes and tastes of the customer 9 as the attribute information. Moreover, the attribute determiner 522 can estimation the race of the customer 9 from the colors of the eyes of the customer 9 included in the sensing result by the gaze sensing part 63. The attribute determiner 522 can check the customer information including the customer IDs acquired from the card reader 64 with customer management information acquired from the center server 80 to determine that the product purchase history or the like of the customer 9 is the attribute information. The household composition may be included in the customer management information or may be estimated from the image captured by the camera 62. That is, if a group of customers 9 of a particular combination of an adult male, an adult female, and a child is extracted from the image captured by the camera 62, the attribute determiner 522 estimates that the household composition includes a married couple and a child. For example, the attribute determiner 522 may be configured to communicate with an information terminal such as a smartphone carried by the customer 9 to receive the customer information from the information terminal.

The emotion determiner 523 determines the emotion of the customer 9 present in the audible area 300 of each of the plurality of directional loudspeakers 3 and generates emotion information representing the emotion. The emotion information is obtained by performing a facial authentication process or the like on the image of the customer 9 captured by the camera 62. A determination algorithm for determining the emotion by the emotion determiner 523 will be described in detail in "(2.3.3) Emotion Determination". Here, the emotion determiner 523 determines the emotion of the customer 9 for each audible area 300. That is, if the presence/absence determiner 521 determines that the customer 9 is present in the audible area 300, the emotion of this customer 9 is determined by emotion determiner 523.

The outputter 53 has a communication function of communicating with the control system 40 (demand information inputter 47). The outputter 53 outputs the demand information determined (generated) by the determiner 52 to the control system 40. In the present embodiment, the determiner 52 generates three information pieces, namely, presence/absence information representing the presence/absence of the customer 9, attribute information representing the attribute of the customer 9, and emotion information representing the emotion of the customer 9. Therefore, the demand information output from the outputter 53 includes the presence/absence information, the attribute information, and the emotion information.

(2.3.2) Human Sensing

Figure 8:
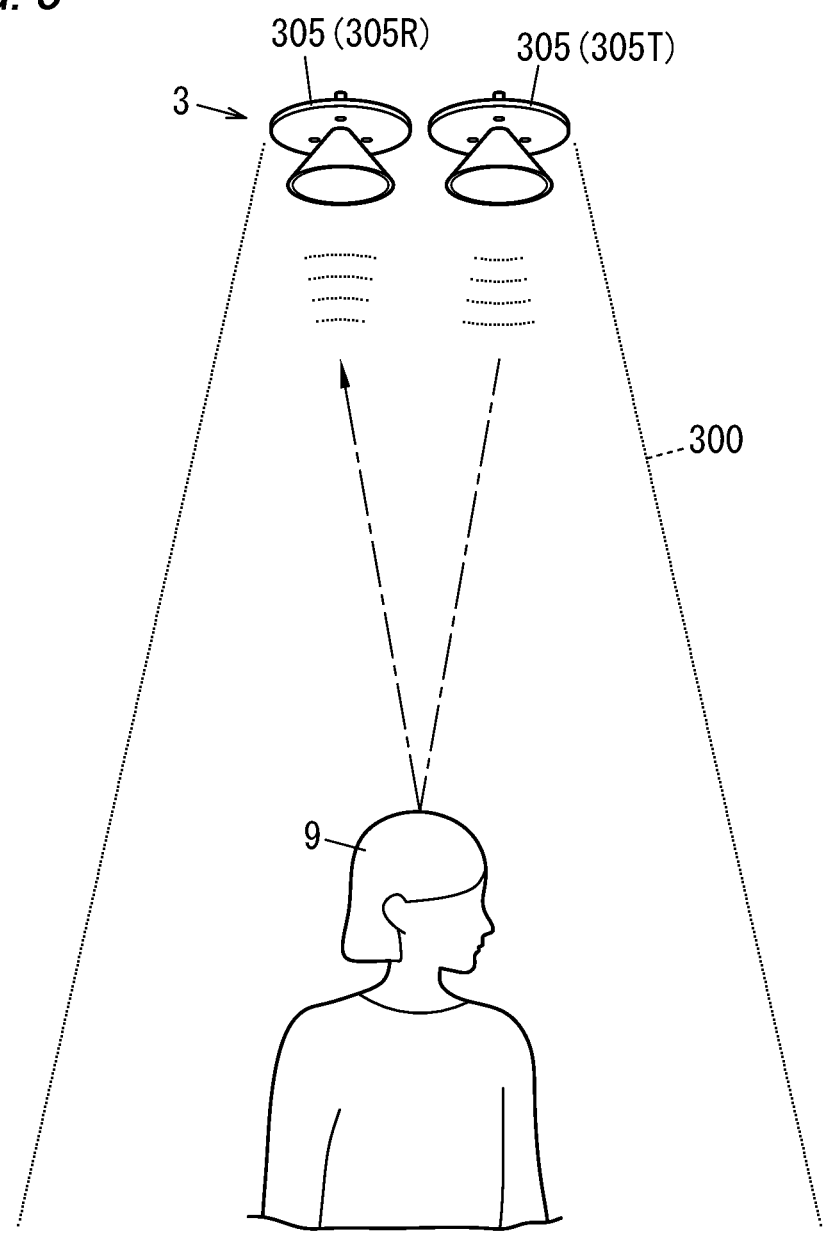
FIG. 8 is a view schematically illustrating a configuration for human sensing by the directional loudspeaker in the product suggestion system.
Figure 9:
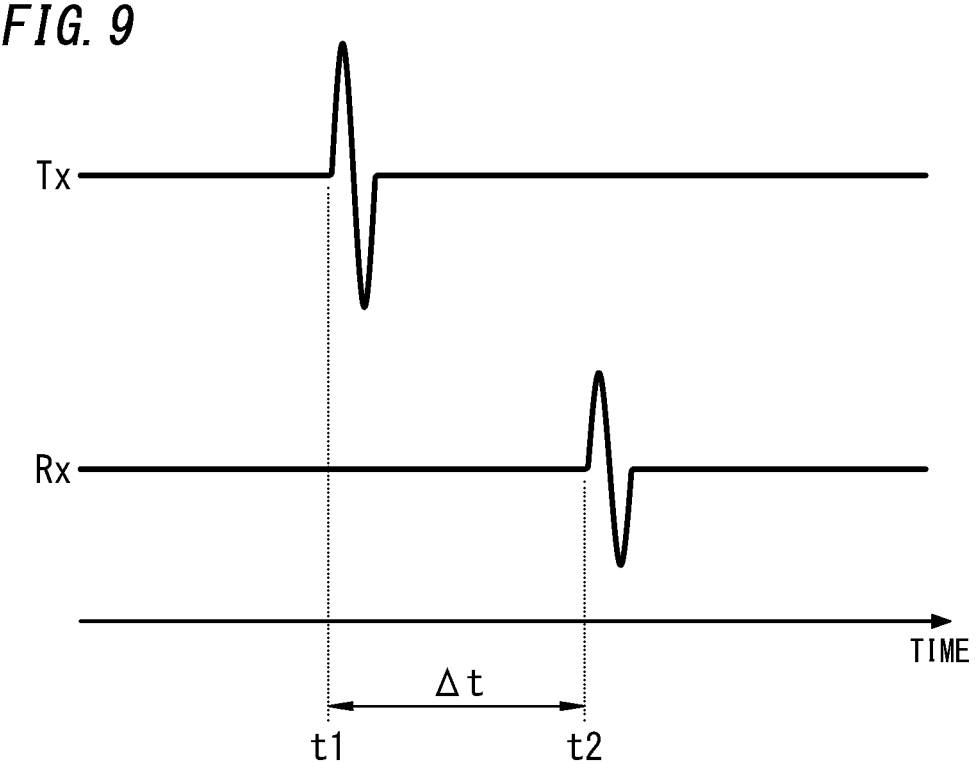
FIG. 9 is a view schematically illustrating operation for human sensing by the directional loudspeaker in the product suggestion system.

A configuration in which the directional loudspeaker 3 is used also as the motion detector 61 will be described further in detail with reference to FIGS. 8 and 9. For example, as illustrated in FIG. 8, the directional loudspeaker 3 uses a particular ultrasonic transducer 305 of the plurality of ultrasonic transducers 305 (only two of which are shown in the example of FIG. 8) as a transmitter and another ultrasonic transducer 305 of the plurality of ultrasonic transducers 305 as a receiver. The sonic wave transducer used as the transmitter is hereinafter also referred to as an ultrasonic transducer 305T, and the sonic wave transducer used as the receiver is hereinafter also referred to as an ultrasonic transducer 305R. The ultrasonic transducer 305T intermittently emits a burst wave toward the audible area 300 without modulation. If a person (customer 9) is present in the audible area 300, the burst wave is reflected off the customer 9, and a reflection wave (the burst wave) is received by the ultrasonic transducer 305R. Therefore, as shown in FIG. 9, the distance from the directional loudspeaker 3 to the customer 9 can be estimated from a time difference $\Delta t$ between time point t1 at which the ultrasonic transducer 305T emits the burst wave and time point t2 at which the ultrasonic transducer 305R receives the burst wave. In FIG. 9, "Tx" represents a waveform transmitted by the ultrasonic transducer 305T, and "Rx" represents a waveform received by the ultrasonic transducer 305R, where the abscissa represents a time axis. The time difference $\Delta t$ is obtained, for example, by a signal processor 31 (see FIG. 4), and the signal processor 31 senses the presence/absence of the person (customer 9) in the audible area 300. This eliminates the need for a device, such as a heat ray sensor, for sensing a person. Further, the directional loudspeaker 3 which has sensed the presence of the customer 9 outputs a sound (audible sound) precisely toward the customer 9, and thereby, it is possible to let the sound (audible sound) output from the directional loudspeaker 3 be heard by the customer 9.

(2.3.3) Emotion Determination

Figure 10:
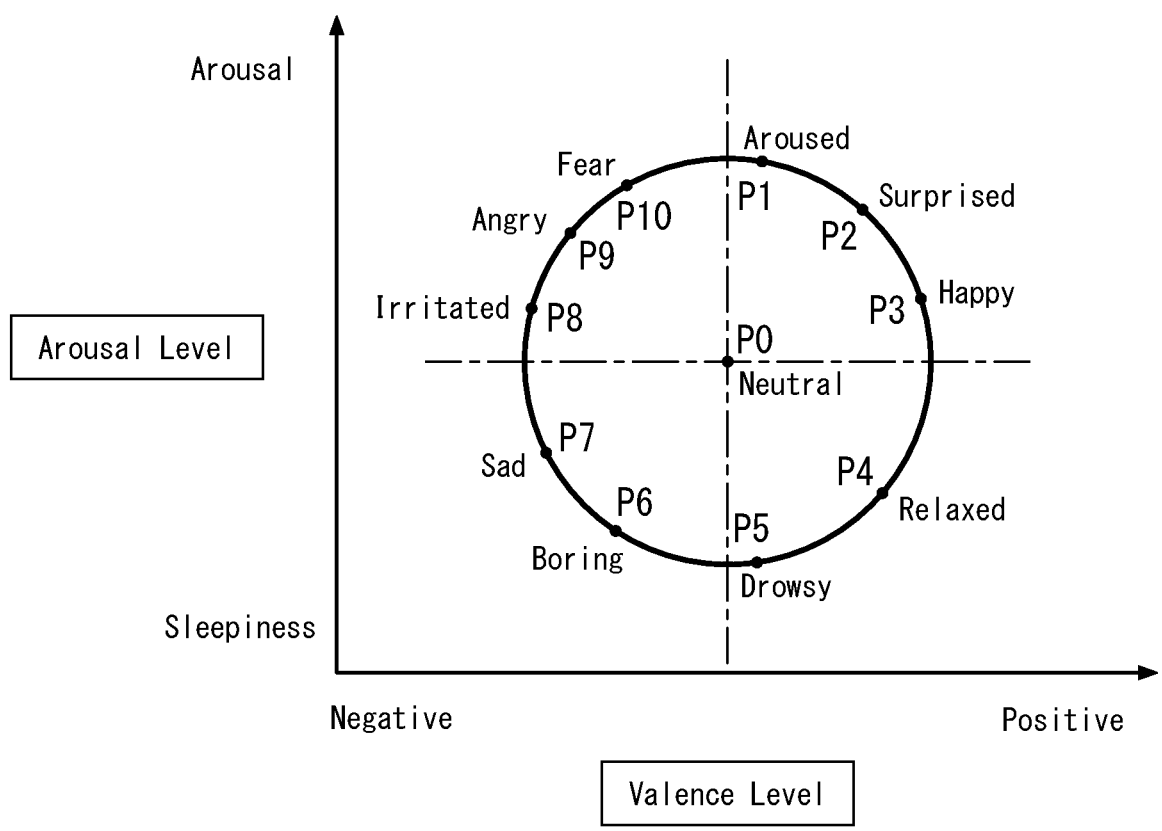
FIG. 10 is an explanatory view illustrating determination of emotions used in the product suggestion system and showing an example of a two-dimensional model of human emotions, which is called Russell's circumplex model.

The determination algorithm for determining the emotion in the emotion determiner 523 will be described below with reference to FIG. 10. FIG. 10 is a view illustrating a two-dimensional model of human emotions, referred to as Russell's circumplex model.

In general, people feel various emotions, such as happiness and surprise. In FIG. 10, the various emotions felt by a person are arranged on a plane having two axes of an Arousal Level indicating the level of arousal and Valence Level indicating the level of comfort. It is known that the human emotions can be arranged toroidally in the plane.

Based on data acquired by the acquirer 51, the emotion determiner 523 first calculates the arousal level indicating the level of arousal of the customer 9 and the valence level indicating a level of comfort of the customer 9.

For example, when emotion determiner 523 computes the arousal level based on the facial color of a customer 9, the emotion determiner 523 compares a red luminance value of a facial image of the customer 9 with a reference value of the red luminance value of a facial color which the emotion determiner 523 has as a parameter. Then, the arousal level calculated when the red luminance value of the image of the face of customer 9 is equal to the reference value becomes zero, and the arousal level calculated is greater as the red luminance value of image on the face of customer 9 is larger.

For example, when the emotion determiner 523 calculates the valence level based on the expression of a customer 9, the emotion determiner 523 specifies the expression from feature points of facial parts in an image of the customer 9 and calculates the valence level based on a correspondence relationship between the expression and the valence level. The correspondence relationship between the expression and the valence level is stored in the memory.

The emotion determiner 523 estimates an emotion of the customer 9 from the arousal level and valence level calculated. At this time, the emotion determiner 523 estimates the emotion of the customer 9 based on the correspondence relationship of the level of arousal and level of comfort of people with respect to emotions of the people. The correspondence relationship of the level of arousal and level of comfort with respect to the emotions of the people corresponds, for example, to Russell's circumplex model shown in FIG. 10 and is stored in the memory. When Russell's circumplex model is used, the emotion determiner 523 plots a point corresponding to the arousal level and the valence level thus acquired on the plane in which the ordinate represents the arousal level and the abscissa represents the valence level, and the emotion determiner 523 estimates the emotion assigned to the point in Russell's circumplex model as the emotion of the customer 9.

For example, Russell's circumplex model in FIG. 10 has a center point P0 to which "Neutral" is assigned, and particular emotions are assigned based on two values, namely, the arousal level and valence level. In the example shown in FIG. 10, points P1, P2, P3, P4, P5, P6, P7, P8, P9, and P10 are assigned to Aroused, Surprised, Happy, Relaxed, Drowsy, Boring, Sad, Irritated, Angry, and Fear, respectively.

For example, however, when the estimation of the emotion based on Russell's circumplex model is performed based on only the facial expression of a person, an estimation result may not sufficiently coincide with an actual emotion. The reason for this is probably because non-physiological data such as the facial expression has a strong correlation with the valence level in Russell's circumplex model and a weak correlation with the arousal level. In addition, the arousal level in Russell's circumplex model is strongly correlated with physiological data such as the heart rate. Therefore, appropriately using the non-physiological data and the physiological data enables the emotion estimation using Russell's circumplex model to be performed with increased accuracy. That is, the emotion determiner 523 preferably calculates the arousal level having a relatively high correlation with the physiological data based on the physiological data and calculates the valence level having a relatively high correlation with the non-physiological data based on the non-physiological data.

The physiological data is data regarding vital functions. The physiological data includes data representing, for example, at least one of facial color, heart rate, heart rate variation, Low Frequency/High Frequency (LF/HF) of heart rate variation, R-R intervals, pulse waves, pulse rate variability, brain waves, respiratory rate, respiratory volume, blood flow, blood flow variability, blood pressure, blood pressure variability, or oxygen saturations. The physiological data may also be data of, for example, body portion movements, body muscle movements, facial muscle movements, body temperature, skin temperature, skin conductance, skin resistance, skin roughness, skin gloss, sweat volume, sweat rate, and the like. Here, examples of the movement of the portion of the body include the frequency, speed, and the like of blinking.

Of the data regarding the living body, data other than physiological data is the non-physiological data. For example, the non-physiological data includes data representing at least one of facial expression, emotion, touch input signal, voice, linguistic expression, sentence, or gesture. Here, the data representing the facial expression is data of the locations, shapes, or the like of the mouth, eyes, eyebrows, and the like, which is read from the image of the face. The data representing the emotion included in the non-physiological data is data obtained by a means other than the emotion determiner 523 and is, for example, data that the customer 9 inputs as his/her own emotion.

(2.4) Operation of Product Suggestion System (2.4.1) Basic Operation

The operation of the product suggestion system 10 according to the present embodiment will be described below with reference to FIG. 11. FIG. 11 is a flow chart indicating the operation of the control system 40.

The control system 40 first acquires supply information regarding the target product from the supply status management system 20 (S1). The control system 40 determines whether or not the supply information thus acquired satisfies condition A which is prescribed (S2). Here, the condition A about the supply information is stored in the storage 44.

The condition A is, for example, that the quantity of stock of the target product in the premise 100 is equal to or more than a prescribed quantity of stock (overstock) or that the sales volume of the target product in a predetermined time period (for example, the day) in the premise 100 is equal to or less than a prescribed sales volume. The prescribed quantity of stock, the prescribed sales volume, and the like are prescribed for each product 5. The condition A may be prescribed by combining the quantity of stock and the sales volume of the target product. For example, when the sales of the target product should be promoted, the condition A is defined such that the quantity of stock of the target product in the premise 100 is equal to or more than the prescribed quantity of stock and the sales volume is equal to or less than the prescribed sales volume. The condition A may be changed based on clock information representing the present time (including, for example, date and day of the week). For example, the control system 40 changes the condition A such that the prescribed quantity of stock of the products 5 is reduced when the present time enters a time zone (for example, 7:00 p.m. to 8:00 p.m.) close to the closing time of the premise 100.

When the control system 40 determines that the supply information regarding the target product satisfies the condition A (S2: YES), the control system 40 acquires demand information from the demand status determination system 50 (S3). At this time, the control system 40 acquires the demand information regarding the customer 9 in the audible area 300 of the directional loudspeaker 3 corresponding to the target product. For example, it is assumed that the product 5a is the target product, and in this case, the control system 40 acquires the demand information of the audible area 300 of the directional loudspeaker 3a corresponding to the product 5a based on the correspondence relationship shown in Table 1.

The control system 40 determines whether or not the demand information thus acquired satisfies condition B which is prescribed (S4). Here, the condition B about the demand information is stored in the storage 44. The condition B is, for example, that the customer 9 is present in the audible area 300 of the directional loudspeaker 3 corresponding to the target product. The condition B may also include a condition for at least one of the attribute information or the emotion information. For example, the condition B includes that the attributes of the customer 9 included in the attribute information are, for example, female and 20 years of age or over.

Here, in the present embodiment, based on a correspondence relationship between each of the plurality of kinds of products 5 and each of the attribute information pieces, the control system 40 defines at least one kind of product(s) 5 of the plurality of kinds of products 5 as the target product, the at least one kind of product(s) 5 corresponding to the attribute information included in the demand information. That is, the control system 40 determines that the product 5 not corresponding to the attribute information included in the demand information is not the target product. Therefore, when the attribute information included in the demand information of the audible area 300 of a directional loudspeaker 3 corresponds to none of at least one kind of products 5 corresponding to the directional loudspeaker 3, it is determined that the condition B is not satisfied.

Specifically, if the attribute information of the customer 9 present in the audible area 300 does not satisfy the condition B, the control system 40 does not cause the directional loudspeaker 3 having this audible area 300 to produce a speech output of the product information regarding the corresponding target product. For example, the condition B is that the attribute information contains particular likes and tastes or product purchase history. In a specific example in this case, the control system 40 causes the directional loudspeaker 3 having the audible area 300 to produce a speech output of the product information regarding the product 5a only when a customer 9 who regularly purchases the product 5a is present in the audible area 300. For another example, it is assumed that the condition B is that the attribute information includes a particular gender, age-group, race, or household composition. In a specific example in this case, the control system 40 causes the directional loudspeaker 3 corresponding to the target product including a hygiene product to produce a speech output of the product information regarding the target product (hygiene product) only when a female customer 9 is present in the audible area 300.

Similarly, based on a correspondence relationship between each of the plurality of kinds of products 5 and each of the emotion information pieces, the control system 40 defines at least one kind of product(s) 5 of the plurality of kinds of products 5 as the target product, the at least one kind of product(s) 5 corresponding to the emotion information included in the demand information. That is, the control system 40 determines that the product 5 not corresponding to the emotion information included in the demand information is not the target product. Therefore, when the emotion information included in the demand information of the audible area 300 of a directional loudspeaker 3 corresponds to none of at least one kind of products 5 corresponding to the directional loudspeaker 3, it is determined that the condition B is not satisfied.

Specifically, if the emotion information of the customer 9 present in the audible area 300 does not satisfy the condition B, the control system 40 does not cause the directional loudspeaker 3 having this audible area 300 to produce a speech output of the product information regarding the corresponding target product. For example, the condition B is that the emotion information is a particular emotion. In a specific example in this case, the control system 40 causes the directional loudspeaker 3 corresponding to the target product including a leisure product to produce a speech output of the product information regarding the target product (leisure product) only when a customer 9 having an emotion of "happiness" is present in the audible area 300.

If the control system 40 determines that the demand information satisfies the condition B (S4: YES), the control system 40 determines the contents of the product information and the audible area 300 to which the product information is to be output as a speech output (S5). At this time, the control system 40 determines, based on both the supply information and the demand information, the contents of the product information which is to be produced as a speech output from the directional loudspeaker 3 and to which of the plurality of audible areas 300 defined in the premise 100 the speech output of the product information is to be directed.

Here, for example, the control system 40 selects candidate information according to the supply information and the demand information as the product information from a plurality of candidate information pieces relating to the target product, and the control system 40 causes the directional loudspeaker 3 to produce a speech output of the product information thus selected. That is, based on the supply information and the demand information of the customer 9 present in the audible area 300, the control system 40 selects the product information to be output from the directional loudspeaker 3 having the audible area 300 from the plurality of candidate information pieces.

For example, the control system 40 causes the directional loudspeaker 3 having the audible area 300 to output the product information including the contents according to the likes and tastes or product purchase history of the customer 9 present in the audible area 300. In a specific example in this case, if there are two candidate information pieces, namely, candidate information including the product description regarding the product 5a and candidate information not including the product description regarding the product 5a, the control system 40 causes the candidate information not including the product description to be output as a speech output of the product information when a customer 9 who regularly purchases the product 5a is present in the audible area 300. For another example, the control system 40 causes the directional loudspeaker 3 having the audible area 300 to output the product information including the contents according to the gender, age-group, race, or household composition of the customer 9 present in the audible area 300. In a specific example in this case, if there are two candidate information pieces, namely, candidate information in Japanese and candidate information in English on a target product, the control system 40 selects either of the candidate information pieces as the product information in accordance with the race of the customer 9 present in the audible area 300 of the directional loudspeaker 3 corresponding to this target product. For example, when a customer 9 who is an American is present in the audible area 300, the control system 40 causes the candidate information in English to be produced as a speech output of a product information. In addition, in the control system 40, there may be two candidate information pieces for a target product which is beef, for example, "Beef for hot pot is at a bargain price" and "Beef for stew with potatoes is at a bargain price". In this case, the control system 40 selects any candidate information as product information according to the household composition of the customer 9 present in the audible area 300 of the directional loudspeaker 3 corresponding to this target product.

The plurality of candidate information pieces may be stored in the storage 44, or only one candidate information piece may be stored in the storage 44, and based on the one candidate information, the remaining candidate information pieces may be generated. For example, if there are two candidate information pieces, namely candidate information in Japanese and candidate information in English, the storage 44 may store the candidate information in Japanese, and the candidate information in English may be generated by translating the candidate information in Japanese. The plurality of candidate information pieces may be the same in the text itself and may differ only in the reading speed (reproduction speed) of the text when a speech is output.

Thereafter, the control system 40 controls the speech output system 30 such that the directional loudspeaker 3 produces a speech output of the product information regarding the target product (S6). If the supply information does not satisfy the condition A (S2: No), or if the demand information does not satisfy the condition B (S4: No), the process of the control system 40 returns to step S1.

Here, the product suggestion system 10 according to the present embodiment is configured to move the audible area 300 of the directional loudspeaker 3 along with the movement of customer 9. That is, in the present embodiment, since a timing at which the directional loudspeaker 3 is caused to produce a speech output or the content of the speech output is determined based on the customer 9, the audible area 300 preferably tracks the customer 9 so that the speech output is directed to the customer 9. Specifically, when the customer 9 sensed by the motion detector 61 moves, the control system 40 controls the speech output system 30 (driver 32) to move the audible area 300 of the directional loudspeaker 3 so that the customer 9 does not go out of the audible area 300.

The basic operation of the product suggestion system 10 described above enables the product suggestion as exemplified in FIG. 1. The example in FIG. 1 schematically shows that the customer 9 looks at products 5 which are slices of beef for steak and which are displayed in a refrigeration showcase 120. In the example in FIG. 1, it is assumed that the attribute information corresponding to "20 years" or over and the emotion information corresponding to "pleasure" and "surprise" are associated with the products 5 (slices of beef for steak). In FIG. 1, the configuration of the product suggestion system 10 is schematically represented in a block diagram, and the positional relationship and the like of each part of the product suggestion system 10 with respect to the refrigeration showcase 120 are completely different from actual ones.

In the situation in FIG. 1, there is a stock of products 5 (beef for steak) in the refrigeration showcase 120, and the quantity of stock of the products 5 (beef for steak) is managed in the supply status management system 20. Based on the supply information acquired from the supply status management system 20, the control system 40 determines that the quantity of stock of the target products (beef for steak) in the premise 100 is equal to or larger than the prescribed quantity of stock. Accordingly, the control system 40 determines that the supply information of the target product satisfies the condition A (S2 in FIG. 11: Yes).

Moreover, in the situation shown in FIG. 1, the image of the customer 9 captured by the camera 62 is input to the demand status determination system 50. The demand status determination system 50 determines the attribute and emotion of the customer 9 from this image. At this time, the demand status determination system 50 determines that the attribute information is "30 years old" and the emotion information of the customer 9 is "pleasure" for the customer 9 present in the audible area 300 in front of the target product (beef for steak). Based on the demand information acquired from the demand status determination system 50, the control system 40 determines that the demand information satisfies the condition B (S4 in FIG. 11: Yes).

Thus, the control system 40 controls the speech output system 30 such that the directional loudspeaker 3 corresponding to the target product (beef for steak) outputs the product information regarding the target product. As a result, the product suggestion is executed for the customer 9 present in the audible area 300 in front of the target product (beef for steak).

2.4.2. Continuous Suggestion Mode

The product suggestion system 10 according to the present embodiment has not only the normal mode for producing a speech output based on the supply information and the demand information as described in "(2.4.1) Basic Operation" but also a plurality of operation modes including a continuous suggestion mode. The product suggestion system 10 is configured to operate while switching between the plurality of operation modes.

In the continuous suggestion mode, the control system 40 causes, based on the correspondence relationship between the product 5 and the directional loudspeaker 3, the directional loudspeaker 3 corresponding to a target product including at least one kind of the plurality of kinds of products 5 to produce a speech output of the product information regarding the target product. For example, it is assumed that the product 5*a* is the target product, and in this case, the control system 40 causes, based on the correspondence relationship shown in Table 1, the directional loudspeaker 3*a* corresponding to the product 5*a* to produce a speech output of the product information regarding the product 5*a*. The control system 40 causes the directional loudspeaker 3 to repeatedly produce the speech output of the product information regarding the product 5.

Here, in the present embodiment, since two or more products 5 are associated with one directional loudspeaker 3, the control system 40 causes the directional loudspeaker 3 to sequentially produce speech outputs of product information pieces regarding the two or more products 5 corresponding to the directional loudspeaker 3. For example, the control system 40 causes the directional loudspeaker 3*a* corresponding to a product group including the products 5*a*, 5*b*, 5*d*, 5*e*, 5*g*, and 5*h* to sequentially produce speech outputs of product information pieces, for example, to produce a speech output of the product information regarding the product 5*a* at first, and then, to produce a speech output of the product information regarding the product 5*b*. In this case, the control system 40 causes the directional loudspeaker 3 to repeatedly produce speech outputs of the product information pieces regarding the two or more products 5 corresponding to the directional loudspeaker 3.

(2.4.3) Update of Product Information

When an event related to the target product occurs, the control system 40 updates the product information regarding the target product based on the event. That is, for example, when an event such as limited-time sale occurs, the control system 40 updates, based on the event, the product information which is to be produced as a speech output from the directional loudspeaker 3.

For example, when an event of limited-time sale of discounting particular products 5 occurs in a specific time zone, the control system 40 changes prices or the like for product information regarding the products 5 which are to be subjected to the limited-time sale. Changed information (e.g., discounted price) is acquired by the control system 40 from the supply status management system 20, the center server 80, or the like. In this way, for example, the speech output content "Flour produced by XYZ Foods is 324 yen including tax" is changed to "Special price only for now. Flour produced by XYZ Foods is 216 yen including tax".

Updating of the product information is not limited to a change along with a price reduction (discount) such as the limited-time sale, but the product information may be a changed to, for example, contents for advertisement. Specifically, when sale of particular products 5 has to be promoted, the speech output content "Flour produced by XYZ Foods is 324 yen including tax" for the particular products 5 is changed to "Flour produced by XYZ Foods is recommended".

(3) Variations

The first embodiment is only one of various embodiments of the present disclosure. Various modifications may be made to the first embodiment depending on design and the like as long as the object of the present disclosure is achieved. Moreover, functions similar to those of the product suggestion system 10 may be realized by a product suggestion method, a computer program, a non-transitory storage medium storing a computer program, or the like.

A product suggestion method according to one aspect is a method of controlling a speech output system 30. The speech output system 30 includes a directional loudspeaker 3 configured to produce a speech output directed to an audible area 300. The audible area 300 is defined by at least one of the presence area of the customer 9 or the selling space as a unit in a premise 100 in which a plurality of kinds of products 5 are displayed. In the product suggestion method, the directional loudspeaker 3 is caused to produce a speech output of product information regarding a target product based on supply information. The supply information is acquired from a supply status management system 20 and represents the supply status of the target product. The target product includes at least one kind of product(s) 5 of a plurality of kinds of products 5. A program according to one aspect is a program configured to cause a computer system to execute the product suggestion method.

Variations of the first embodiment will be described below. The variations described below are applicable accordingly in combination.

(3.1) First Variation

Figure 12A:
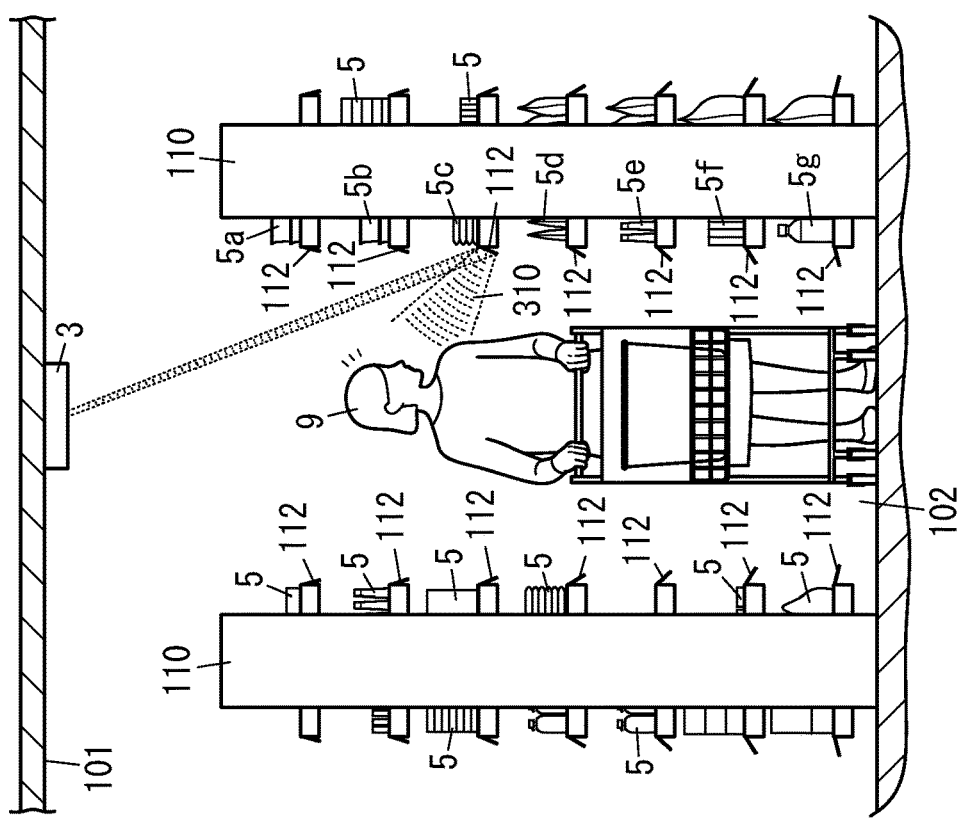
FIG. 12A is a front view illustrating an example of an installation state of a product suggestion system according to a first variation of the first embodiment.

As shown in FIG. 12A, in a product suggestion system 10 according to a first variation of the first embodiment, a propagation path 310 of a sound from a directional loudspeaker 3 is set such that the sound reaches an audible area 300 from a side where at least one kind of product(s) 5 corresponding to the directional loudspeaker 3 is provided. In this configuration, a customer 9 present in the audible area 300 hears the sound from the side where the product(s) 5 is provided. In the example shown in FIG. 12A, at least some of the plurality of kinds of products 5 are displayed on a display rack 110 having a plurality of display spaces 111 (see FIG. 5B).

In the configuration shown in FIG. 12A, the directional loudspeaker 3 is installed in the same display space 111 (see FIG. 5B) as the corresponding products 5 in the display rack 110. In the example shown in FIG. 12A, directional loudspeakers 3 are installed in all display spaces 111 of display racks 110, and directional loudspeakers 3*a*, 3*b*, 3*c*, 3*d*, 3*e*, 3*f*, and 3*g* are associated with products 5*a*, 5*b*, 5*c*, 5*d*, 5*e*, 5*f*, and 5*g* respectively. Therefore, the directional loudspeakers 3*a*, 3*b*, 3*c*, 3*d*, 3*e*, 3*f*, and 3*g* are installed in the same display spaces 111 as the corresponding products 5*a*, 5*b*, 5*c*, 5*d*, 5*e*, 5*f*, and 5*g* respectively. For each directional loudspeaker 3, a radiation direction of an ultrasonic wave is set such that the ultrasonic wave is radiated to the height of the head of the customer 9. Here, a control system 40 may distinguish, for example, whether the customer 9 is a child or an adult based on attribute information, and the control system 40 may change the radiation direction of the ultrasonic wave radiated from the directional loudspeaker 3 by estimating the height of the head of the customer 9.

As a result, for example, product information regarding the product 5*c* is to be produced as a speech output from the directional loudspeaker 3*c* installed in the vicinity of the product 5*c*, and consequently, the propagation path 310 of the sound is set such that the sound reaches the customer 9 present in the audible area 300 from a side where the product 5*c* is provided.

(3.2) Second Variation

Figure 12B:
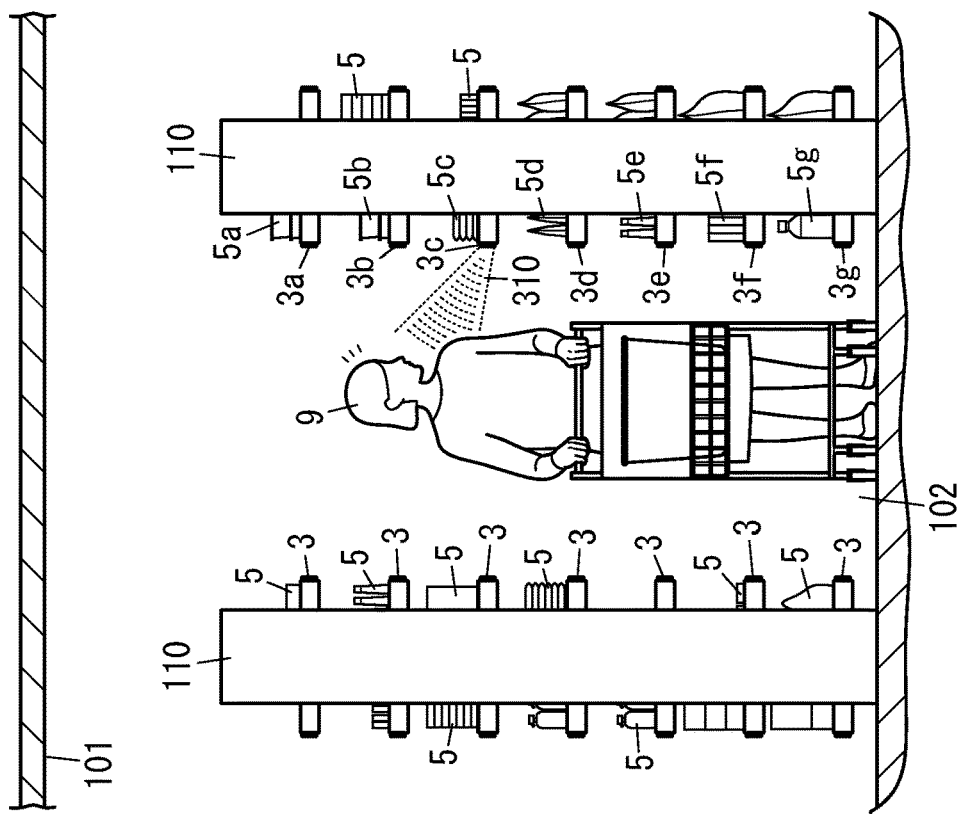
FIG. 12B is a front view illustrating an example of an installation state of a product suggestion system according to a second variation of the first embodiment.

As illustrated in FIG. 12B, a product suggestion system 10 according to a second variation of the first embodiment differs from the first variation in that a sound reaches an audible area 300 from a product 5 by using reflection of the sound.

In a similar manner to the first variation, also in the second variation, a propagation path 310 of the sound from a directional loudspeaker 3 is set such that the sound reaches an audible area 300 from a side where at least one kind of product(s) 5 corresponding to the directional loudspeaker 3 is provided. In this configuration, a customer 9 present in the audible area 300 hears the sound from the side where the product(s) 5 is provided. In the example shown in FIG. 12B, at least some of the plurality of kinds of products 5 are displayed on a display rack 110 having a plurality of display spaces 111 (see FIG. 5B).

In the configuration shown in FIG. 12B, the directional loudspeaker 3 is configured such that the sound is reflected off a reflection surface 112 located at the display rack 110 in the same display space 111 (see FIG. 5B) as the corresponding products 5. In the example shown in FIG. 12B, reflection surfaces 112 are installed at all the display spaces 111 of the display racks 110, and the reflection surfaces 112 each include a surface of a reflection plate whose mounting angle is adjustable in the present embodiment. The directional loudspeaker 3 is installed in a ceiling 101 and is configured to emit an ultrasonic wave toward the reflection surfaces 112. A radiation direction of the ultrasonic wave from the directional loudspeaker 3 is adjustable by a movable device 65. For each reflection surface 112, a reflection direction of the ultrasonic wave is set such that the ultrasonic wave is reflected to the height of the head of the customer 9. Here, a control system 40 may distinguish, for example, whether the customer 9 is a child or an adult based on attribute information, and the control system 40 may change the reflection direction of the ultrasonic wave reflected off the reflection surface 112 by estimating the height of the head of the customer 9.

As a result, for example, product information regarding the product 5*c* is to be produced as a speech output by using reflection at the reflection surface 112 installed in the vicinity of the product 5*c*, and consequently, the propagation path 310 of the sound is set such that the sound reaches the customer 9 present in the audible area 300 from a side where the product 5*c* is provided.

(3.3) Other Variations

Variations other than the first and second variations of the first embodiment are listed below.

The product suggestion system 10 in the present disclosure includes computer systems, for example, in the control system 40 and the demand status determination system 50. In each computer system, a processor and memory as hardware are included as main components. The processor executes a program stored in the memory of each computer system, thereby realizing the function as the product suggestion system 10 (control system 40, demand status determination system 50, etc.) of the present disclosure. The program may be stored in the memory of the computer system in advance, may be provided via telecommunications network, or may be provided as a non-transitory recording medium such as a computer system-readable memory card, optical disc, or hard disk drive storing the program. The processor of the computer system includes one or more electronic circuits including a semiconductor integrated circuit (IC) or a large-scale integrated circuit (LSI). The plurality of electronic circuits may be collected on one chip or may be distributed on a plurality of chips. The plurality of chips may be collected in one device or may be distributed in a plurality of devices.

In addition, a technique such as machine learning may be used for some of the processes of the product suggestion system 10, for example, a process of determining the contents of the product information based on the supply information and the demand information.

In addition, a plurality of functions in the product suggestion system 10 may be integrated in one housing, or the components of the product suggestion system 10 may be provided in a plurality of housings distributed manner. Further, at least some of the functions of the product suggestion system 10 may be realized by, for example, cloud (cloud computing). In contrast, in the first embodiment, at least some of functions of the product suggestion system 10 distributed in a plurality of devices may be collected in one housing.

The directional loudspeaker 3 is not limited to a parametric speaker using an ultrasonic wave as a carrier wave but may be a narrow directional loudspeaker such as a planar wave loudspeaker. Further, the communication scheme between the directional loudspeaker 3 and the signal processor 31 is not limited to wired communication but may be, for example, wireless communication using a radio wave such as Bluetooth (registered trademark) as a medium or optical communication using light such as an infrared ray as a medium.

The correspondence relationship of the plurality of directional loudspeakers 3 with respect to the plurality of kinds of products 5 is not limited to a one-to-many relationship but may be a one-to-one relationship. That is, each of the plurality of directional loudspeakers 3 is associated with at least one kind of product(s) 5 of the plurality of kinds of products 5, and one kind of product(s) 5 may be associated with one directional loudspeaker 3.

Further, the above-described embodiment has illustrated a configuration in which the speech output system 30 includes a plurality of directional loudspeakers 3, but the speech output system 30 may include only one directional loudspeaker 3. In this case, applying the configuration of FIG. 12B described in "(3.2) Second Variation" also enables the sound to reach the audible area 300 from the directions of the plurality of kinds of products 5.

The product information to be produced as a speech output from the directional loudspeaker 3 is not limited to the text sentence but may be, for example, a chime, music, or the like as long as the directional loudspeaker 3 can give a notification to the customer 9 in the audible area 300.

Further, the audible area 300 of the directional loudspeaker 3 is defined by at least one of the presence area of the customer 9 or the selling space as a unit in the premise 100 but is not limited to a place in front of or in the vicinity of at least one kind of product(s) 5 corresponding to the directional loudspeaker 3. For example, the audible area 300 of the directional loudspeaker 3 may be defined in a location where many customers 9 pass through, such as an entrance to the premise 100. In this case, the product information to be produced as the speech output from the directional loudspeaker 3 preferably includes contents for suggesting the location of products 5 in the premise 100, for example, "available in the spice section".

Second Embodiment

Figure 13:
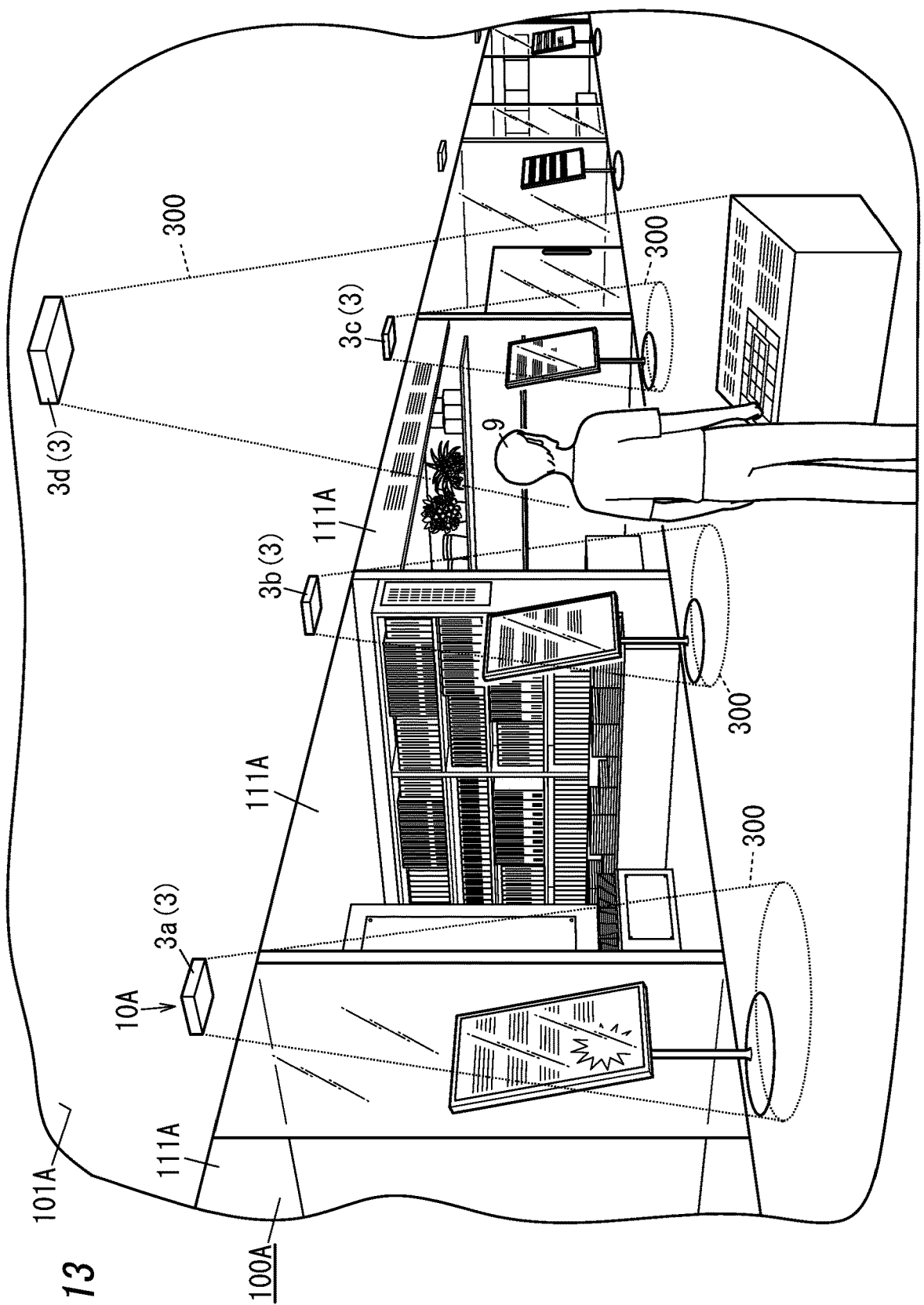
FIG. 13 is a perspective view illustrating an installation state of a product suggestion system according to a second embodiment.

As shown in FIG. 13, a product suggestion system 10A according to the present embodiment is a system introduced into a premise 100A, such as a shopping mall or a shopping center, including a plurality of retail establishments 111A. Components similar to those in the first embodiment are hereinafter denoted by the same reference signs as those in the first embodiment, and the description thereof is accordingly omitted.

In the present embodiment, each of a plurality of directional loudspeakers 3 produces a speech output directed to an audible area 300 defined by a "selling space" as a unit corresponding to each of the retail establishments 111A included in the premise 100A. That is, in the premise 100A including the plurality of retail establishments 111A, each retail establishment 111A also serves as one selling space. The plurality of directional loudspeakers 3 are associated with the plurality of retail establishments 111A on a one-to-one basis. In other words, one directional loudspeaker 3 corresponding to one retail establishment 111A is associated with all products 5 displayed in this retail establishment Specifically, as shown in FIG. 13, the plurality of directional loudspeakers 3 are installed on a ceiling 101A of the premise 100A such that the vicinity of an entrance to each corresponding retail establishment 111A is the audible area 300.

The product suggestion system 10A includes a control system 40 which causes a directional loudspeaker 3 corresponding to a target product including one of a plurality of kinds of products 5 to produce a speech output of product information regarding the target product. That is, in a similar manner to the first embodiment, also in the product suggestion system 10A of the present embodiment, the control system 40 unitarily manages which information (product information) is to be produced as a speech output from the plurality of directional loudspeakers 3. Thus, the product suggestion system 10A enables the directional loudspeakers 3 to audibly notify customers 9 passing in front of the retail establishments 111A of information (product information) regarding the products 5 handled by the respective retail establishments 111A. Therefore, for example, by using information for advertisement of each retail establishment 111A as the product information, it is possible to expect an effect of attracting the interest of people who are about to simply pass by a place in front of the retail establishment 111A.

Further, in the present embodiment, at least one directional loudspeaker 3d included in the product suggestion system 10A is used for a different purpose from that of the other directional loudspeakers. That is, as shown in FIG. 13, the directional loudspeaker 3d is installed, for example, in the vicinity of the entrance of the premise 100A and defines the periphery of a so-called guide plate as the audible area 300. Specifically, the directional loudspeaker 3d is not associated with a particular retail establishment 111A but is associated with the plurality of retail establishments 111A included in the premise 100A. The control system 40 is configured to cause the directional loudspeaker 3d to alternatively produce a speech output of product information pieces for advertisement of the plurality of retail establishments 111A. This enables any retail establishment 111A to be advertised to the customer 9 present in front of the guide plate.

Here, the control system 40 determines a retail establishment 111A whose product information is to be produced as a speech output from the directional loudspeaker 3d. For example, each tenant may pay a fee as an advertisement usage fee to an administrator of the premise 100A to obtain right to cause the directional loudspeaker 3d to produce a speech output of the product information of his/her retail establishment 111A. Alternatively, the control system 40 may automatically determine, in accordance with the gender, age-group, or the like of the customer 9 present in front of the guide plate, a retail establishment 111A whose product information is to be produced as a speech output from the directional loudspeaker 3d. In this case, the technique of determining the speech output contents based on the attribute information described in "(2.4.1) Basic Operation" is applicable. As a specific example, when a female customer 9 is present in front of the guide plate, the control system 40 causes the directional loudspeaker 3d to produce a speech output of the product information of a retail establishment 111A selling cosmetics.

The configuration described in the second embodiment is applicable in appropriate combination with the configuration described in the first embodiment (including the variations).

Summary

As described above, a product suggestion system (10, 10A) of a first aspect includes a speech output system (30) and a control system (40). The speech output system (30) includes a directional loudspeaker (3) configured to produce a speech output directed to at least one audible area (300). The at least one audible area (300) is defined by at least one of a presence area of a customer (9) or a selling space as a unit in a premise (100, 100A) in which a plurality of kinds of products (5) are displayed. The control system (40) is configured to control the speech output system (30). The control system (40) is configured to cause the directional loudspeaker (3) to produce a speech output of product information regarding the target product based on supply information. The supply information is information which is acquired from a supply status management system (20) and which represents a supply status of the target product. The target product includes at least one kind of product(s) (5) of a plurality of kinds of products (5).

With this configuration, the directional loudspeaker (3) produces a speech output of the product information regarding the target product including at least one kind of product(s) 5 in the plurality of kinds of products (5) based on the supply information acquired by the control system (40) from the supply status management system (20). Here, since the audible area (300) of the directional loudspeaker (3) is defined as a specific location in the premise (100, 100A), it is possible to let the product information regarding the target product be targeted at and listened by only a customer (9) present in the specific location in the premise (100, 100A). Therefore, the information regarding the target product is to be audibly notified by targeting at only the customer (9) present in the specific location in the premise (100, 100A). Accordingly, the product suggestion system (10, 10A) enables a product suggestion in consideration of circumstances of a seller, such as a stock-out or an overstock. This reduces wasteful consumption of resources of the product suggestion system (10, 10A) by, for example, performing a suggestion of a product(s) (5) which is in a stock-out or the like and for which advertisement is thus unnecessary for a retailer. Further, extraction of the supply information does not require information processing, such as image recognition, leading to a relatively large load. Therefore, using the supply information enables the resource required for the extraction of the information to be reduced as compared to a case where the demand information regarding the customer (9), such as the attribute of the customer (9), is used. Further, since the supply information is information having a higher reliability than the demand information extracted by image recognition or the like, the reliability of the product suggestion system (10, 10A) can be improved by using the supply information.

In a product suggestion system (10, 10A) of a second aspect referring to the first aspect, the control system (40) is configured to determine a content of the product information in accordance with the supply information.

With this configuration, since the content of the product information changes in accordance with the supply information, a speech output of the product information becomes possible, and the speech output corresponds to contents in consideration of circumstances of a seller, such as a stock-out or an overstock.

In a product suggestion system (10, 10A) of a third aspect referring to the first or second aspect, the at least one audible area includes a plurality of audible areas (300) defined in the premise (100, 100A). The control system (40) is configured to determine, based on the supply information, to which of the plurality of audible areas (300) the speech output of the product information is to be directed.

With this configuration, the audible area (300) to which the speech output of the product information is directed changes based on the supply information. Therefore, it becomes possible to produce the speech output of the product information regarding a product 5 in consideration of circumstances of a seller, such as a stock-out or an overstock.

In a product suggestion system (10, 10A) of a fourth aspect referring to any one of the first to third aspects, the supply information is information based on at least one of a quantity of stock or a sales volume of the plurality of kinds of products (5) in the premise (100, 100A).

With this aspect, for example, a product suggestion is possible in consideration of circumstances of a seller, such as a stock-out, an overstock, or a target achievement rate.

In the product suggestion system (10, 10A) of a fifth aspect referring to any one of the first to fourth aspects, the control system (40) is configured to cause the directional loudspeaker (3) to produce the speech output of the product information based on demand information in addition to the supply information. The demand information is information acquired from a demand status determination system (50) and regarding the customer (9) in the audible area (300).

This configuration enables a product suggestion in consideration of not only circumstances of a seller, such as a stock-out or an overstock but also the demand of the customer (9). That is, according to the product suggestion system (10, 10A), matching of supply and demand enables the product suggestion to be performed in consideration of the balance between the supply and the demand.

In a product suggestion system (10, 10A) of a sixth aspect referring to the fifth aspect, the demand information includes attribute information representing an attribute of the customer (9) present in the audible area (300).

This configuration enables an appropriate product suggestion according to the attribute of the customer (9).

In a product suggestion system (10, 10A) of a seventh aspect referring to the sixth aspect, the control system (40) is configured to define, based on a correspondence relationship between each of the plurality of kinds of products (5) and the attribute information, at least one kind of product (5) as described below as the target product. That is, the control system (40) defines at least one kind of product (5) corresponding to the attribute information included in the demand information of the plurality of kinds of products (5) as the target product.

This configuration enables the processing load in the control system (40) to be reduced if the correspondence relationship between each of the plurality of kinds of products (5) and the attribute information is prescribed.

In a product suggestion system (10, 10A) of an eighth aspect referring to any one of the fifth to seventh aspects, the demand information includes emotion information representing an emotion of the customer (9) present in the audible area (300).

This configuration enables an appropriate product suggestion according to the emotion of the customer (9).

In a product suggestion system (10, 10A) of a ninth aspect referring to the eighth aspect, the control system (40) is configured to define, based on a correspondence relationship between each of the plurality of kinds of products (5) and the emotion information, at least one kind of product (5) as described below as the target product. That is, the control system (40) defines at least one kind of product (5) corresponding to the emotion information included in the demand information of the plurality of kinds of products (5) as the target product.

This configuration enables the processing load in the control system (40) to be reduced if the correspondence relationship between each of the plurality of kinds of products (5) and the emotion information is prescribed.

In a product suggestion system (10, 10A) of a tenth aspect referring to the eighth or ninth aspect, the emotion information is represented by two values corresponding to an arousal level indicating a level of arousal of the customer (9) and a valence level indicating a level of comfort of the customer (9).

This aspect enables the emotion of the customer (9) to be determined based on a relatively simple determination algorithm and thus enables the processing load relating to the generation of the emotion information to be reduced.

A product suggestion system (10, 10A) of an eleventh aspect referring to any one of the fifth to ninth aspects further includes a demand status determination system (50).

With this configuration, the demand status determination system 50 is no longer required to be separately prepared.

A product suggestion system (10, 10A) of a twelfth aspect referring to any one of the first to eleventh aspects further includes a supply status management system (20).

With this configuration, the supply status management system 20 is no longer required to be separately prepared.

A product suggestion method of a thirteenth aspect is a method of controlling the speech output system (30). The speech output system (30) includes a directional loudspeaker (3) configured to produce a speech output directed to an audible area (300). The audible area (300) is defined by least one of a presence area of a customer (9) or a selling space as a unit in a premise (100, 100A) in which a plurality of kinds of products (5) are displayed. The product suggestion method includes causing the directional loudspeaker (3) to produce a speech output of product information regarding the target product based on supply information. The supply information is information which is acquired from a supply status management system (20) and which represents a supply status of the target product. The target product includes at least one kind of product(s) (5) of a plurality of kinds of products (5).

With this configuration, the directional loudspeaker (3) produces a speech output of the product information regarding the target product including at least one kind of product(s) 5 in the plurality of kinds of products (5) based on the supply information acquired from the supply status management system (20). Here, since the audible area (300) of the directional loudspeaker (3) is defined as the specific location in the premise (100, 100A), it is possible to let the product information regarding the target product be targeted at and listened by only a customer (9) present in the specific location in the premise (100, 100A). Therefore, the information regarding the target product is to be audibly notified by targeting at only the customer (9) present in the specific location in the premise (100, 100A). Accordingly, the product suggestion method, for example, a product suggestion in consideration of circumstances of a seller, such as a stock-out or an overstock, is possible.

A program of a fourteenth aspect is a program configured to cause the computer system to execute the product suggestion method of the thirteenth aspect.

With this configuration, the directional loudspeaker (3) produces a speech output of the product information regarding the target product including at least one kind of product(s) 5 in the plurality of kinds of products (5) based on the supply information acquired from the supply status management system (20). Here, since the audible area (300) of the directional loudspeaker (3) is defined as the specific location in the premise (100, 100A), it is possible to let the product information regarding the target product be targeted at and listened by only a customer (9) present in the specific location in the premise (100, 100A). Therefore, the information regarding the target product is to be audibly notified by targeting at only the customer (9) present in the specific location in the premise (100, 100A). Accordingly, the program enables, for example, a product suggestion in consideration of circumstances of a seller, such as a stock-out or an overstock.

The above-described embodiments are not to limit the disclosure, but the product suggestion system (10, 10A) of various aspects (including variations) of first and second embodiments is realizable by a product suggestion method and a program.

The configurations of the second to twelfth aspects are not essential configurations for the product suggestion system (10, 10A) and may be accordingly modified.

REFERENCE SIGNS LIST

3, 3*a*, 3*b*, 3*c* . . . DIRECTIONAL LOUDSPEAKER
5, 5*a*, 5*b*, 5*c* . . . PRODUCT
9 CUSTOMER
10, 10A PRODUCT SUGGESTION SYSTEM
20 SUPPLY STATUS MANAGEMENT SYSTEM
30 SPEECH OUTPUT SYSTEM
40 CONTROL SYSTEM
50 DEMAND STATUS DETERMINATION SYSTEM
100, 100A PREMISE
300 AUDIBLE AREA

The invention claimed is:

1. A product suggestion system used on a premises in which a plurality of different kinds products are displayed, comprising:
   a speech output system including a plurality of directional loudspeakers, each directional loudspeaker being configured to produce a speech output directed to a corresponding one of one or more audible areas, each audible area being defined by at least one of a presence area of a customer or a selling space as a unit in the premises; and
   a control system including one or more processors and configured to control the speech output system, the one or more processors being configured to
      determine at least one kind of product of the plurality of different kinds products as a target product,
      generate contents of product information regarding the target product based on supply information, the supply information being information which is acquired from a supply status management system and which represents a supply status of the target product,
      determine a directional loudspeaker which produces a speech output among the plurality of directional loudspeakers based on a correspondence relationship of the products with respect to the plurality of directional loudspeakers, wherein the plurality of different kinds products are arranged in a plurality of display spaces, and the correspondence relationship of the products with respect to the plurality of directional loudspeakers is based on a unique identifier provided to each display space, and the correspondence relationship is stored in a storage device communicably coupled to the one or more processors,
      cause the directional loudspeaker as determined to produce a speech output of the product information as determined, and
      cause the directional loudspeaker to produce the speech output of the product information based on demand information in addition to the supply information,
         wherein the demand information includes attribute information representing an attribute of the customer present in the audible area,
         the attribute information contains product purchase history, and
         the one or more processor direct the directional loudspeaker having the audible area to produce a speech output of the product information regarding the target product only when a customer who regularly purchases the target product is present in the audible area.

2. The product suggestion system of claim 1, wherein the control system is configured to determine a content of the product information in accordance with the supply information.

3. The product suggestion system of claim 1, wherein
   the at least one audible area includes a plurality of audible areas defined in the premise, and
   the control system is configured to determine, based on the supply information, to which of the plurality of audible areas the speech output of the product information is to be directed.

4. The product suggestion system of claim 1, wherein the supply information is information based on at least one of a quantity of stock or a sales volume of the plurality of kinds of products in the premise.

5. The product suggestion system of claim 1, wherein the demand information is information acquired from a demand status determination system and regarding the customer in the audible area.

6. The product suggestion system of claim 5, wherein the demand information includes emotion information representing an emotion of the customer present in the audible area.

7. The product suggestion system of claim 6, wherein the control system is configured to define, based on a correspondence relationship between each of the plurality of kinds of products and the emotion information, at least one kind of product of the plurality of kinds of products as the target product, the at least one kind of product corresponding to the emotion information included in the demand information.

8. The product suggestion system of claim 6, wherein the emotion information is represented by two values corresponding to an arousal level indicating a level of arousal of the customer and a valence level indicating a level of comfort of the customer.

9. The product suggestion system of claim 6, wherein the emotion information corresponds to the largest number of emotion information pieces representing the emotions of a plurality of customers in the audible area.

10. The product suggestion system of claim 5, further comprising the demand status determination system.

11. The product suggestion system of claim 1, wherein the control system is configured to define, based on a correspondence relationship between each of the plurality of kinds of products and the attribute information, at least one kind of product of the plurality of kinds of products as the target product, the at least one kind of product corresponding to the attribute information included in the demand information.

12. The product suggestion system of claim 1, further comprising the supply status management system.

13. The product suggestion system of claim 1, wherein the attribute information corresponds to the largest number of attribute information pieces representing the attribute of a plurality of customers in the audible area.

14. The product suggestion system of claim 1, wherein
two or more products are associated with one directional loudspeaker, and
the processor causes the directional loudspeaker to sequentially produce speech outputs of product information pieces regarding the two or more products corresponding to the directional loudspeaker.

15. A product suggestion method of controlling a speech output system including a plurality of directional loudspeakers, wherein each directional loudspeaker is configured to produce a speech output directed to a corresponding one or more audible areas, the speech output system is located in a premises in which a plurality of different kinds of products are displayed, each audible area is defined by at least one of a presence area of a customer or a selling space as a unit in the premise, and the product suggestion method is executed by one or more processors, the product suggestion method comprising:
determining, by a processor, at least one kind of product of the plurality of different kinds of products as a target product,
generating, by the processor, contents of product information regarding a target product based on supply information, the supply information being information which is acquired from a supply status management system and which represents a supply status of the target product,
determining, by the processor, a directional loudspeaker which produces a speech output among the plurality of directional loudspeakers based on a correspondence relationship of the products with respect to the plurality of directional loudspeakers, wherein the plurality of different kinds products are arranged in a plurality of display spaces, and the correspondence relationship of the products with respect to the plurality of directional loudspeakers is based on a unique identifier provided to each display space, and the correspondence relationship is stored in a storage device communicably coupled to the one or more processors,
directing, by the processor, the directional loudspeaker as determined to produce a speech output of the product information as determined,
directing, by the processor, the directional loudspeaker to produce the speech output of the product information based on a demand information in addition to the supply information,
wherein the demand information includes attribute information representing an attribute of the customer present in the audible area, and the attribute information contains product purchase history, and
directing, by the processor, the directional loudspeaker having the audible area to produce a speech output of the product information regarding the target product only when a customer who regularly purchases the target product is present in the audible area.

16. A non-transitory computer-readable recording medium recording a program configured to cause a computer system to execute the product suggestion method of claim 15.

* * * * *